United States Patent
Hwang et al.

(10) Patent No.: US 11,533,699 B2
(45) Date of Patent: Dec. 20, 2022

(54) METHOD AND APPARATUS FOR V2X COMMUNICATION

(71) Applicant: LG Electronics Inc., Seoul (KR)

(72) Inventors: Jaeho Hwang, Seoul (KR); Woosuk Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/273,976

(22) PCT Filed: Sep. 7, 2018

(86) PCT No.: PCT/KR2018/010516
§ 371 (c)(1),
(2) Date: Mar. 5, 2021

(87) PCT Pub. No.: WO2020/050440
PCT Pub. Date: Mar. 12, 2020

(65) Prior Publication Data
US 2021/0360571 A1    Nov. 18, 2021

(51) Int. Cl.
*H04W 4/44*    (2018.01)
*H04W 64/00*    (2009.01)

(52) U.S. Cl.
CPC ............ *H04W 64/00* (2013.01); *H04W 4/44* (2018.02)

(58) Field of Classification Search
CPC ....... H04W 64/00; H04W 4/44; H04W 76/14; H04W 64/006
See application file for complete search history.

(56) References Cited

U.S. PATENT DOCUMENTS

| | | | |
|---|---|---|---|
| 2018/0227971 A1* | 8/2018 | Yasukawa | H04W 76/14 |
| 2018/0295481 A1* | 10/2018 | Kahtava | H04W 4/40 |
| 2018/0302768 A1* | 10/2018 | Uchiyama | H04W 52/0216 |
| 2019/0028978 A1* | 1/2019 | Yasukawa | H04W 4/70 |
| 2020/0228948 A1* | 7/2020 | Watfa | H04W 36/0061 |

FOREIGN PATENT DOCUMENTS

| | | |
|---|---|---|
| JP | 2004-163295 A | 6/2004 |
| JP | 2006-039762 A | 2/2006 |
| KR | 10-2016-0103764 A | 9/2016 |

OTHER PUBLICATIONS

IEEE 802.11p vehicle to infrastructure communications in urban environments, May 7, 2012.
V2I Applications in Highways: How RSU Dimensioning Can Improve Service Delivery, Jun. 30, 2016.

\* cited by examiner

*Primary Examiner* — Marcus Hammonds
(74) *Attorney, Agent, or Firm* — Dentons US LLP

(57) ABSTRACT

Disclosed is a method of acquiring position information of a vehicle by a V2X communication device of a vehicle through V2I communication. Specifically, the method of acquiring position information of the vehicle includes receiving a first V2I message including position information, transmission power information, and coverage information of a first road side unit (RSU) from the first RSU; acquiring reception power of the first V2I message; and acquiring region information of the vehicle based on the reception power and the coverage information, wherein the region information indicates based on (1) the vehicle being located within the coverage of the first RSU or (2) a specific region within the coverage of the first RSU.

12 Claims, 31 Drawing Sheets

[FIG. 1]
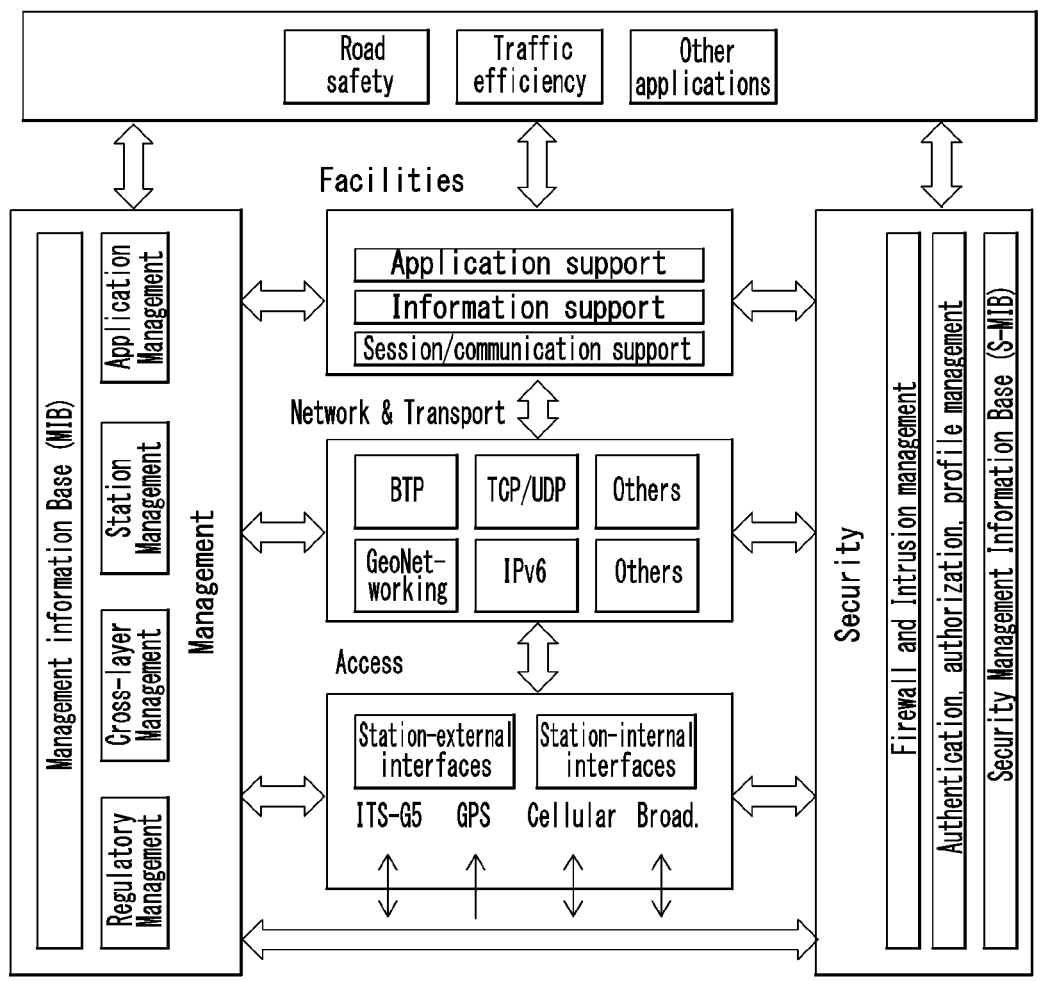

[FIG. 2]
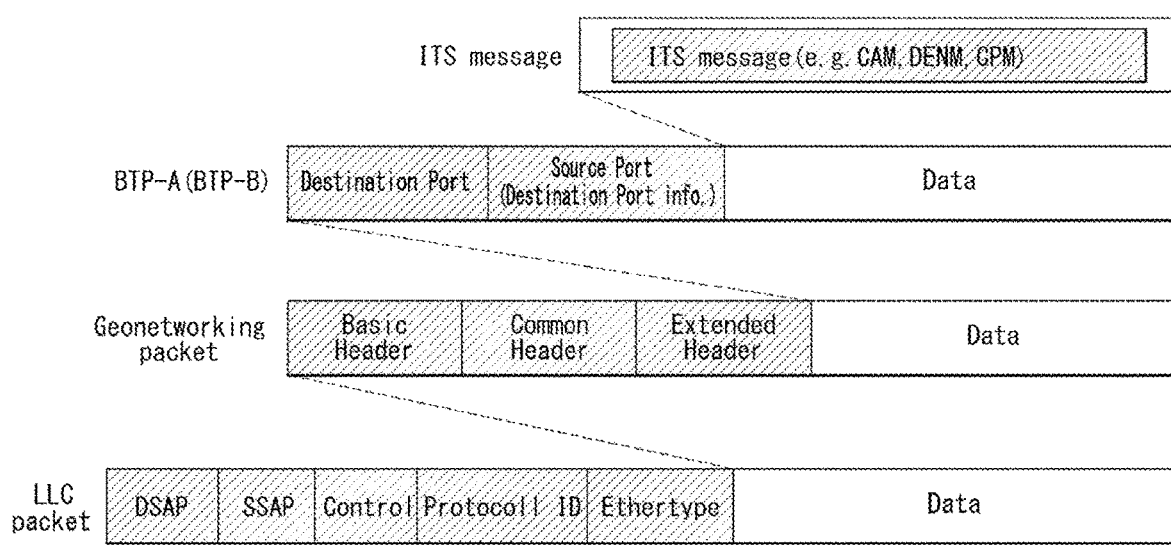

[FIG. 3]
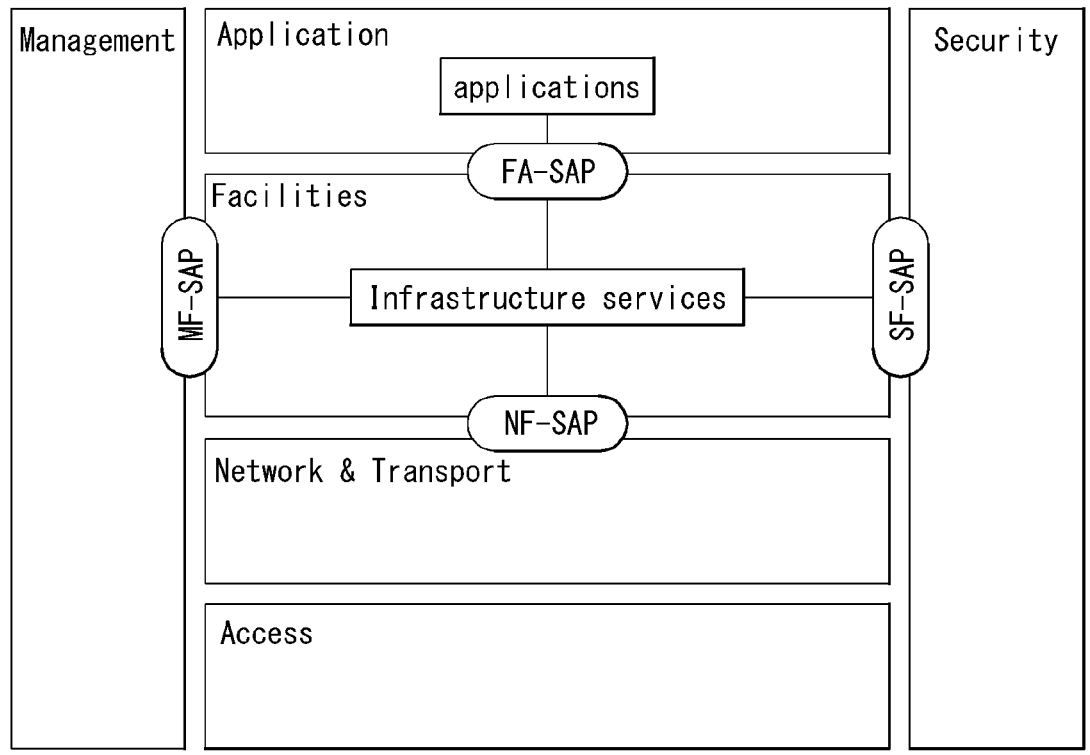
[FIG. 4]
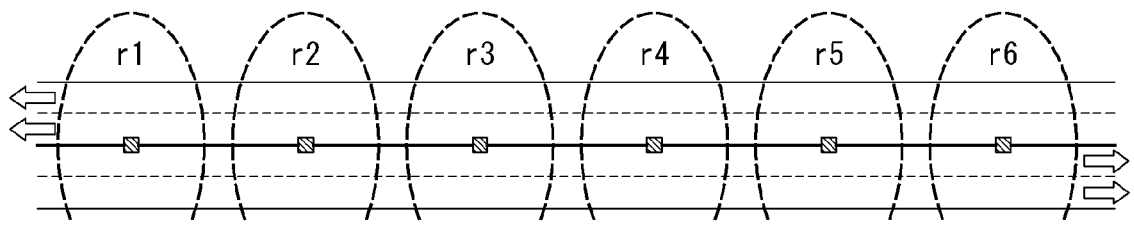

[FIG. 5]
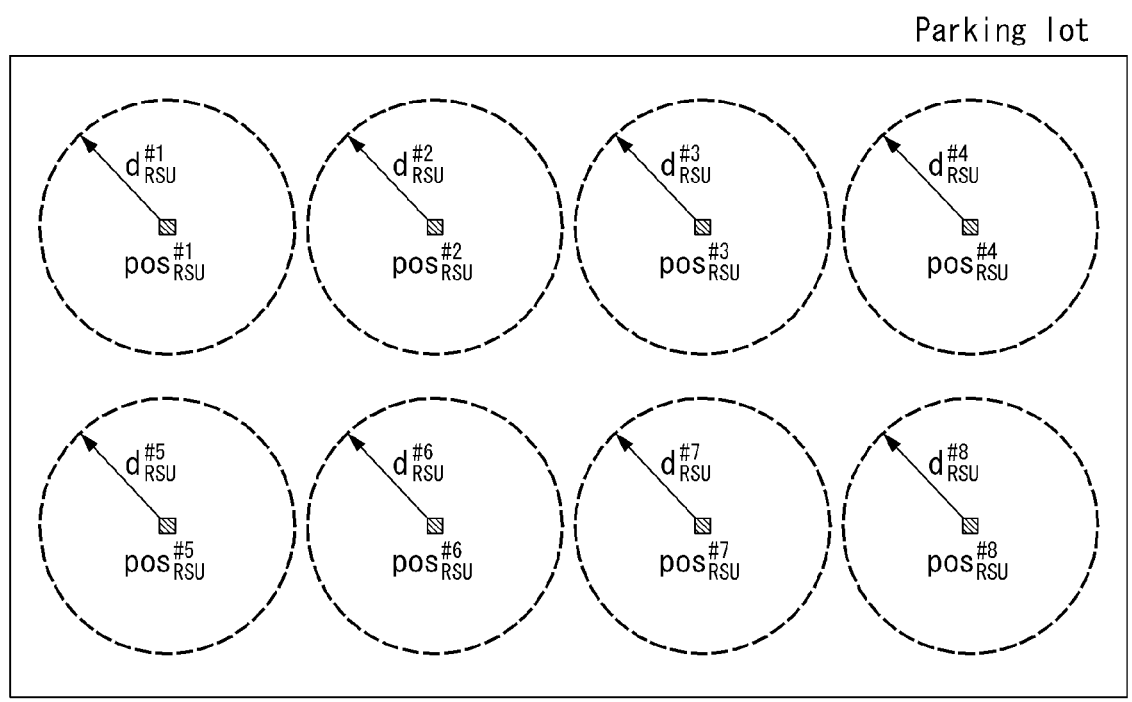
[FIG. 6]
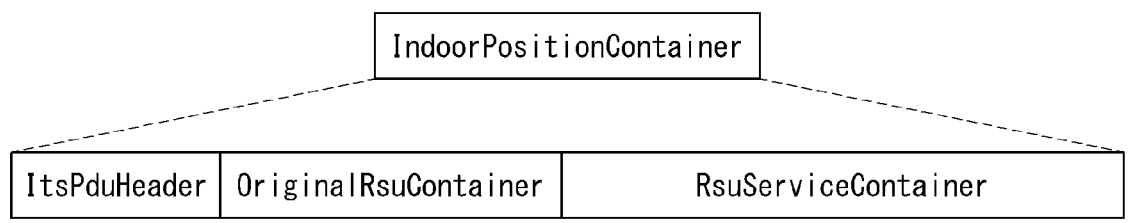

[FIG. 7A]

```
ASN.1 Representation
IPS message              ::= SEQUENCE{
   Header                ItsPduHeader
   OriginalRsuContainer  DF_OriginalRsuContainer
   RsuServiceContainer   DF_RsuServiceContainer
}
```

[FIG. 7B]

```
ASN.1 Representation
DF_OriginalRsuContainer  ::= SEQUENCE{
   timeSteamp        TimeStamelts,      OPTIONAL
   RsuPosition       ReferencePosition
   TransmissionPower integer            -- unit : -x dbm
   Coverage          integer            -- unit : 0.1 meter
}
```

[FIG. 7C]

```
ASN.1 Representation
DF_RsuServiceContainer   ::= SEQUENCE{
   ZoneID        integer
   ZoneName      integer
   ServiceType   integer
   ServiceData   integer
   ControlType   integer
   ControlData   integer
}
```

[FIG. 8]
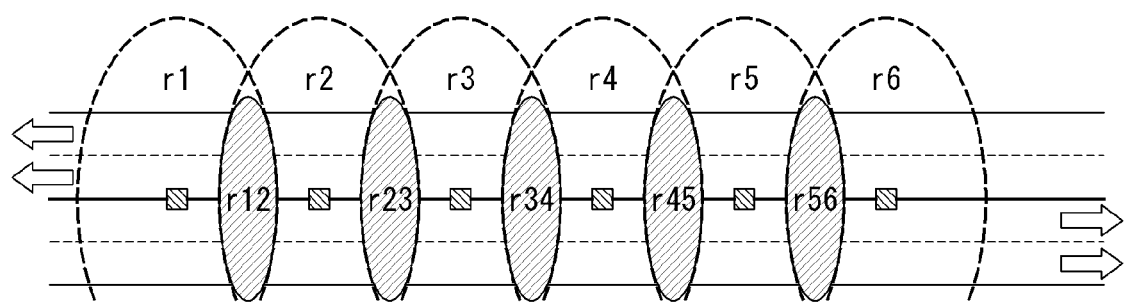

【FIG. 9A】
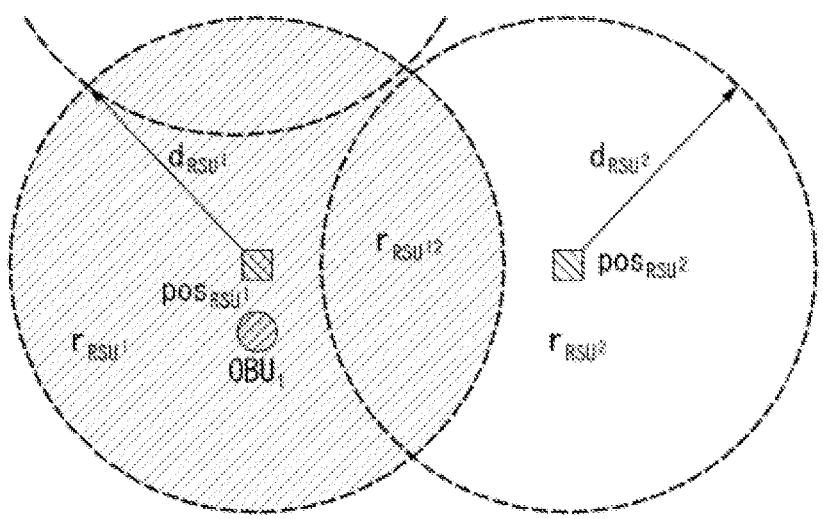
【FIG. 9B】
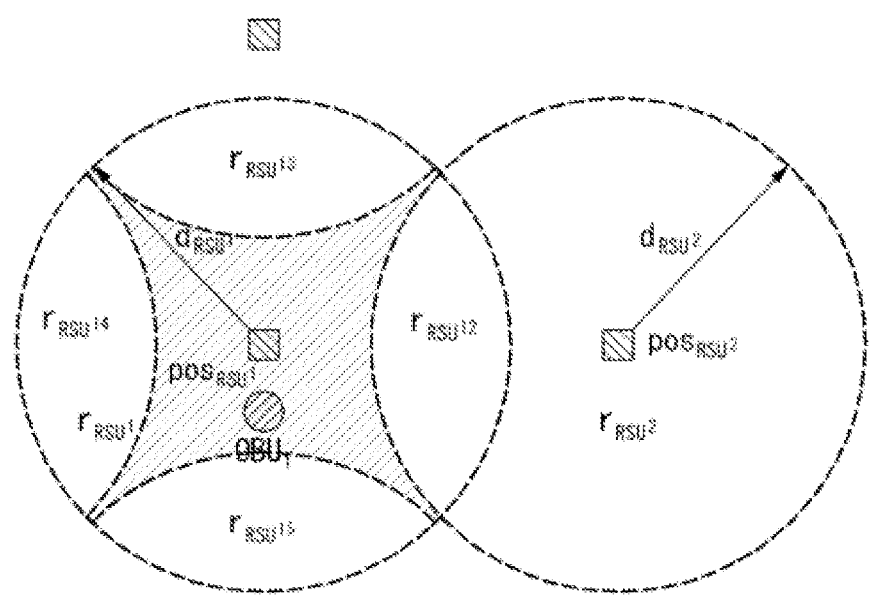

[FIG. 10]
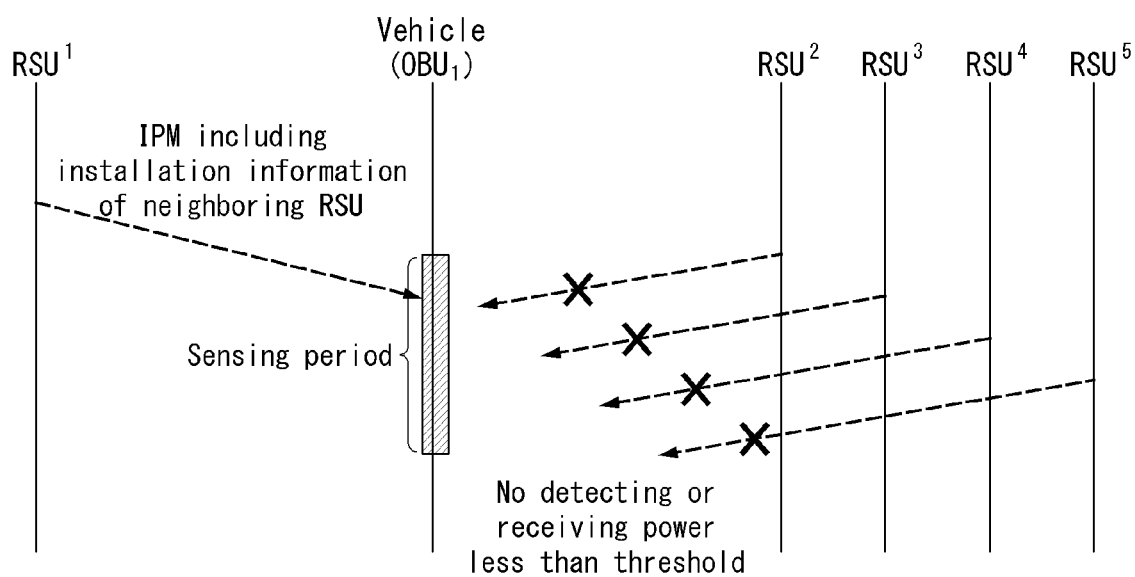

[FIG. 11A]
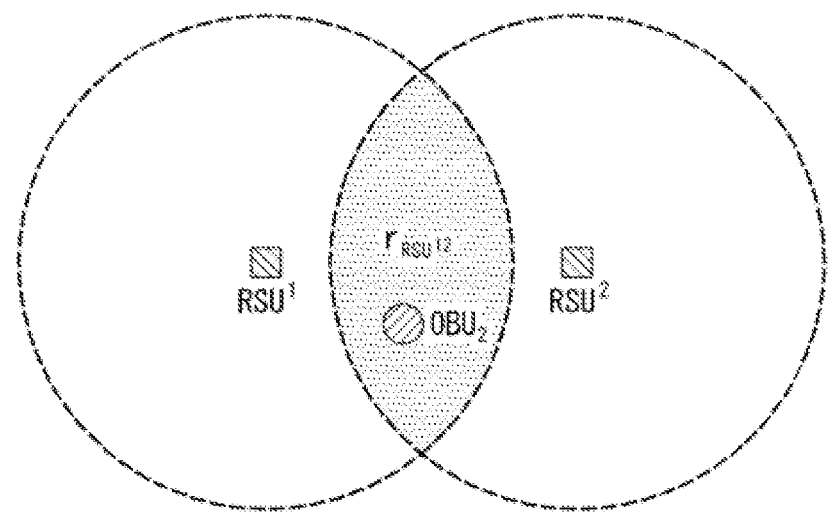
[FIG. 11B]
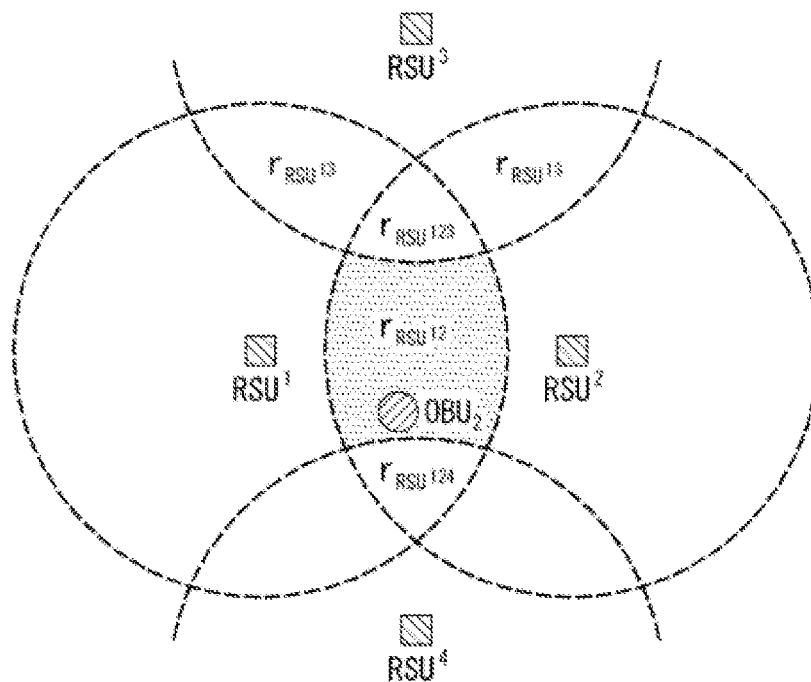

[FIG. 12]
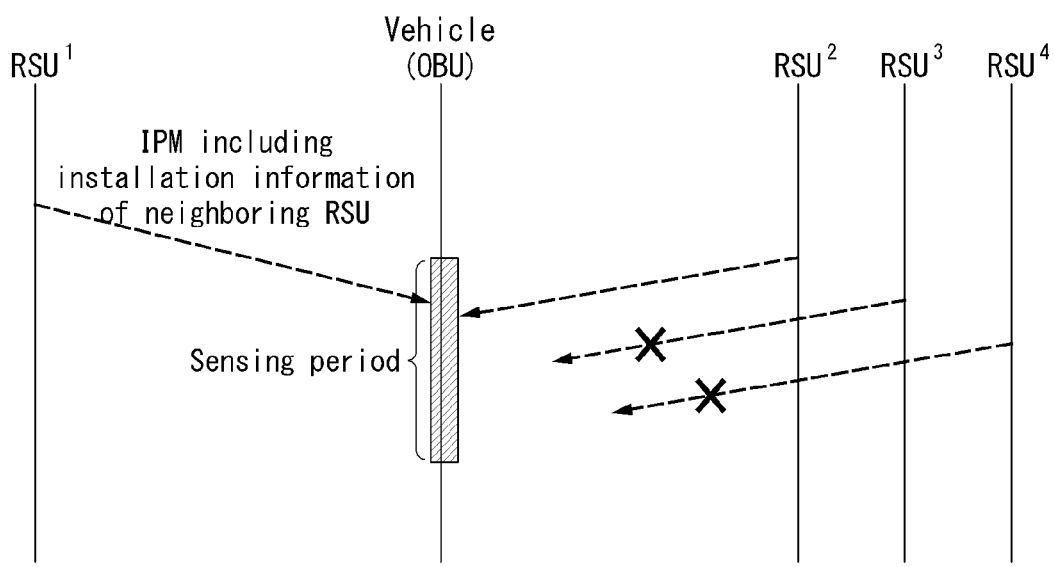
[FIG. 13]
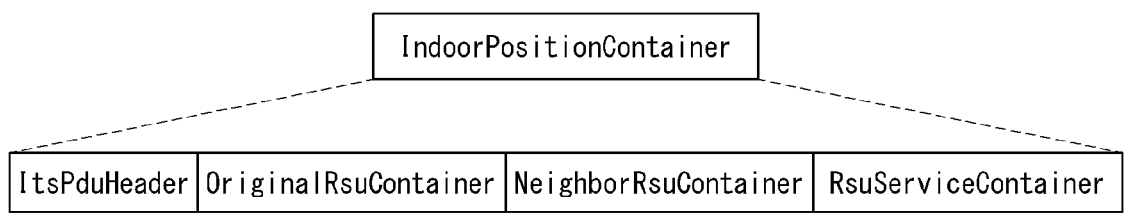

【FIG. 14A】

| ASN.1 Representation | |
|---|---|
| IPS message | ::= SEQUENCE{ |
|   Header | ItsPduHeader |
|   OriginalRsuContainer | DF_OriginalRsuContainer |
|   NeighborRsuContainer | DF_NeighborRsuList |
|   RsuServiceContainer | DF_RsuServiceContainer |
|   } | |
| DF_NeighborRsuList ::= SEQUENCE (SIZE(1..10)) OF DF_NeighborRsuContainer | |

【FIG. 14B】

| ASN.1 Representation | | |
|---|---|---|
| DF_NeighborRsuContainer | ::= SEQUENCE{ | |
|   RsuID | integer | |
|   RsuPos | ReferencePosition | |
|   TransmissionPower | integer | -- unit : -x dbm |
|   Coverage | integer | -- unit : 0.1 meter |
|   } | | |

[FIG. 15]
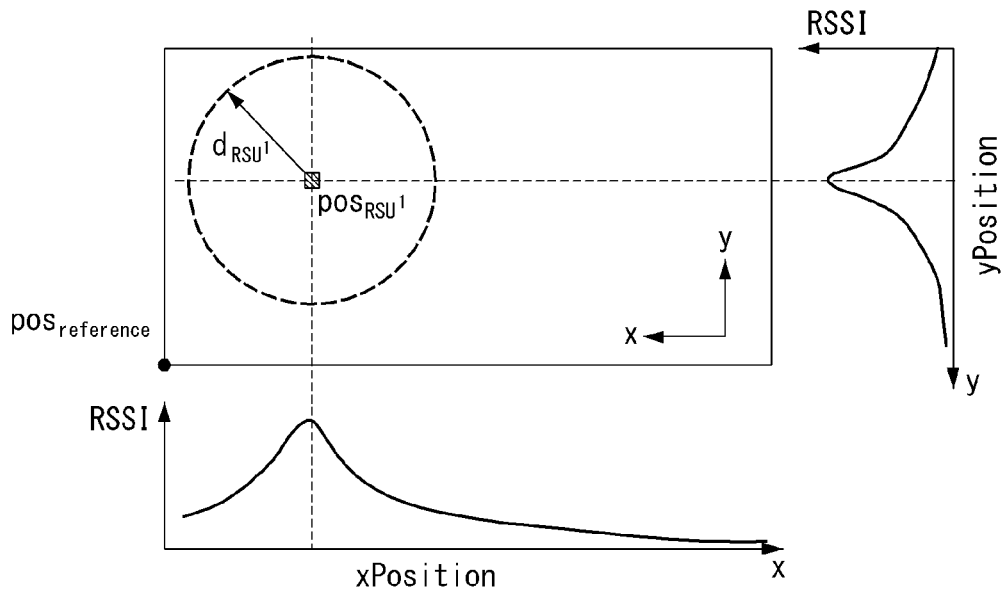
[FIG. 16]
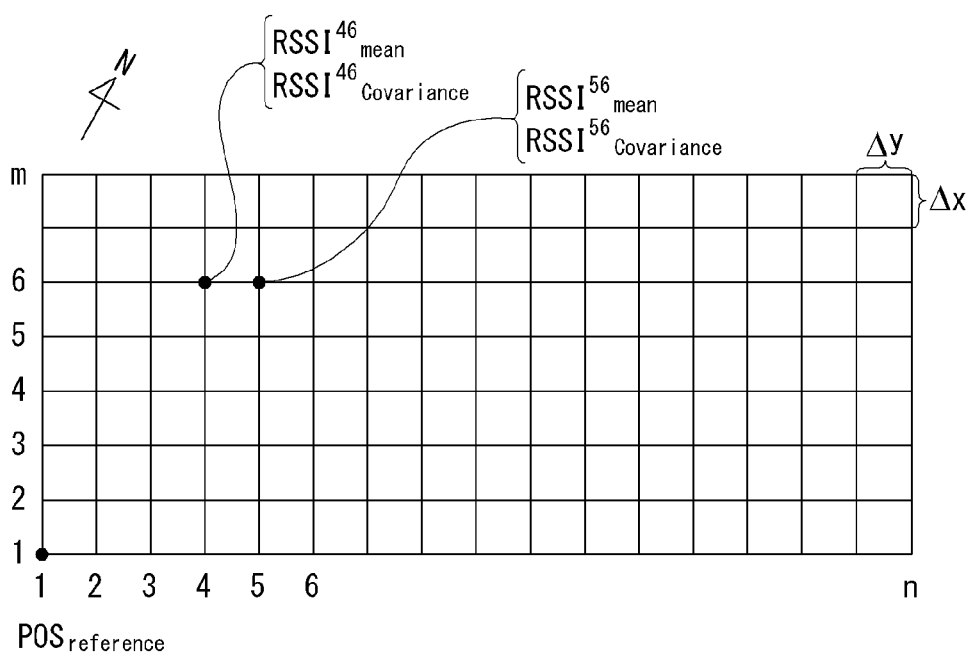

[FIG. 17]
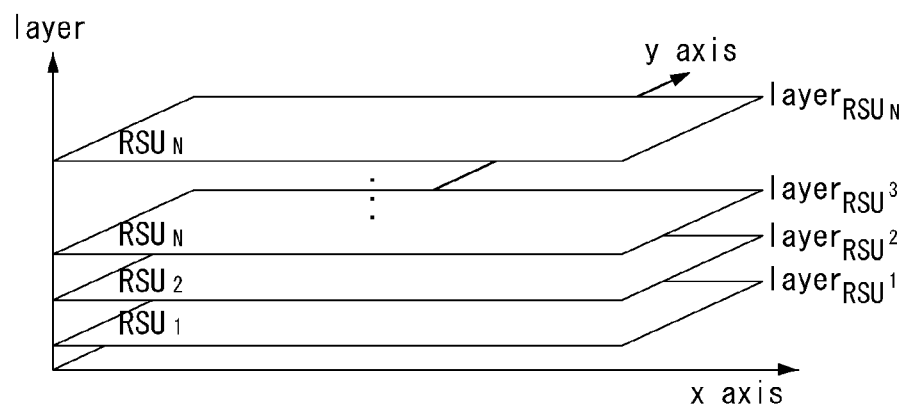
[FIG. 18]
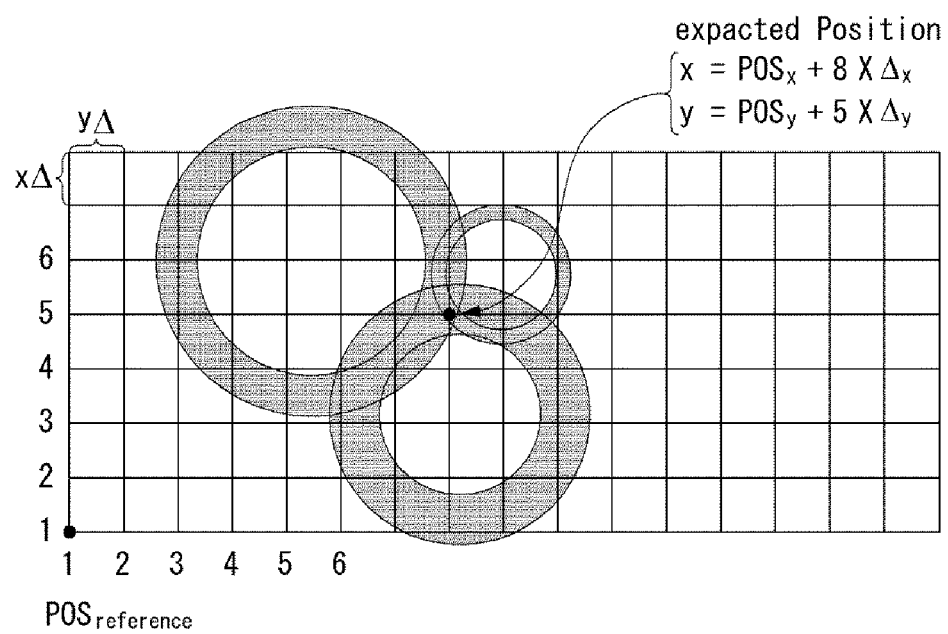

[FIG. 19]

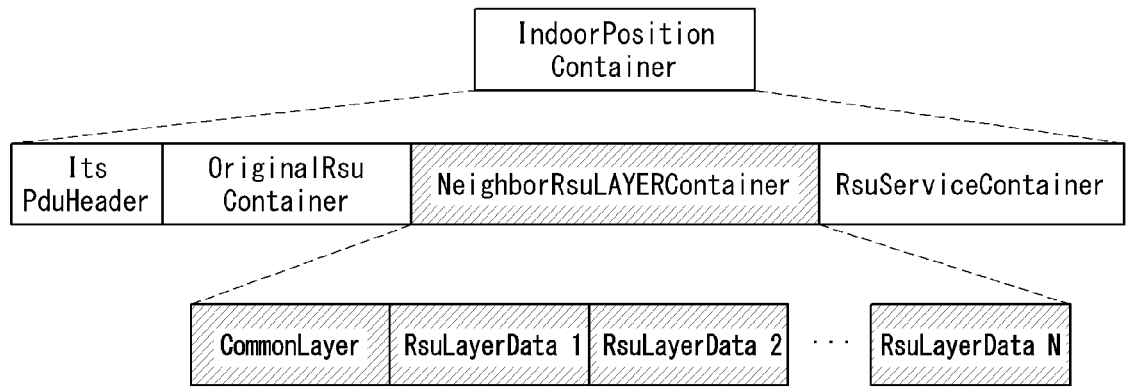

[FIG. 20A]

```
ASN.1 Representation
IPS message              ::= SEQUENCE {
  Header                 ItsPduHeader
  OriginalRsuContainer   DF_OriginalRsuContainer
  NeighborRsuLayerContainer  DF_NeighborRsuLayerContainer
  RsuServiceContainer    DF_RsuServiceContainer
}
```

[FIG. 20B]

```
ASN.1 Representation
DF_NeighborRsuLayerContainer  ::= SEQUENCE {
  PosReference        ReferencePosition
  angleFromNorth      integer        -- unit : degree
  deltaX              integer        -- unit : 0.1 meter
  deltaY              integer        -- unit : 0.1 meter
  NeighborRsuLayerData  NeighborRsuLayerList
}
NeighborRsuLayerList ::= SEQUENCE(SIZE(1..10)) OF RsuLayerData
RsuLayerData = SEQUENCE(SIZE(1..128))of SEQUENCE(SIZE(1..128))of Integer
```

【FIG. 21A】
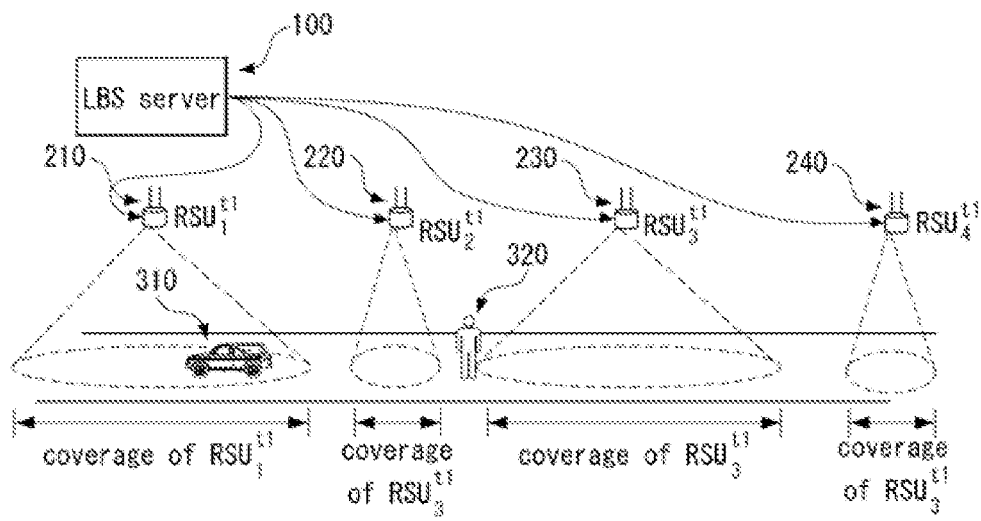
(a) Diagram of RSU power control at time T1
【FIG. 21B】
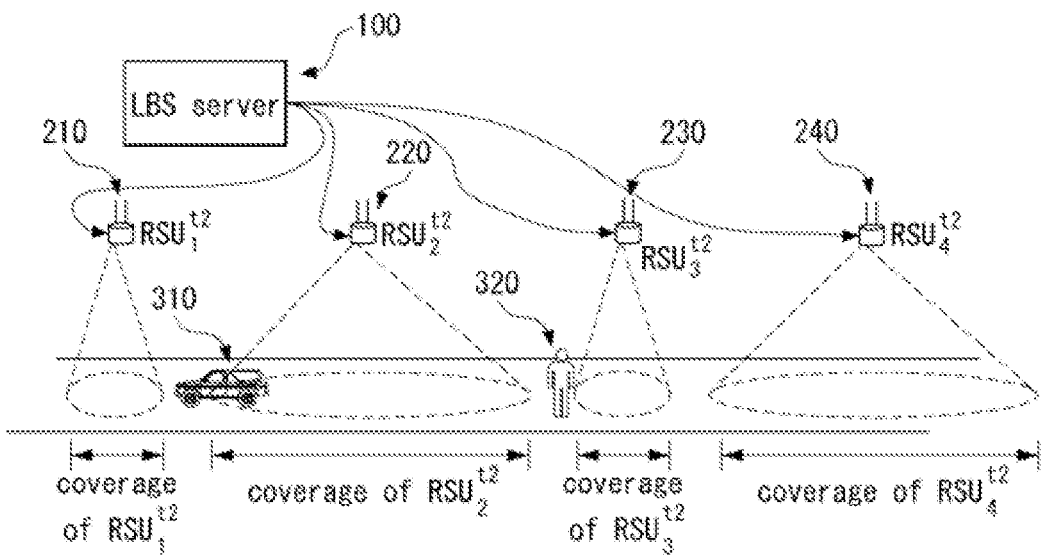
(b) Diagram of RSU power control at time T2

[FIG. 22A]
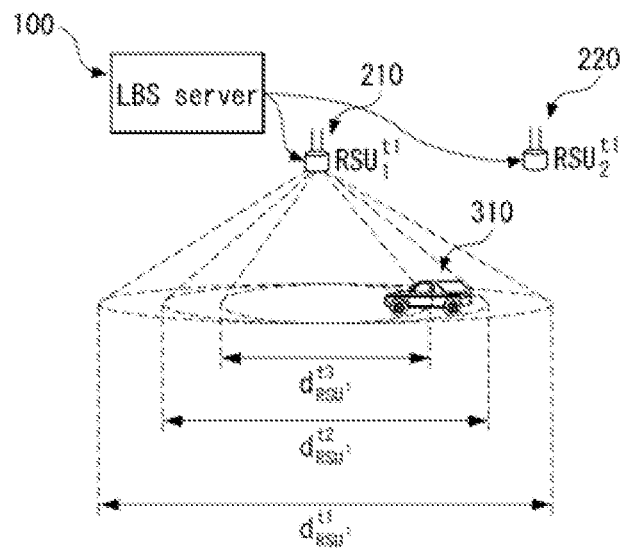
(a) System structure
[FIG. 22B]
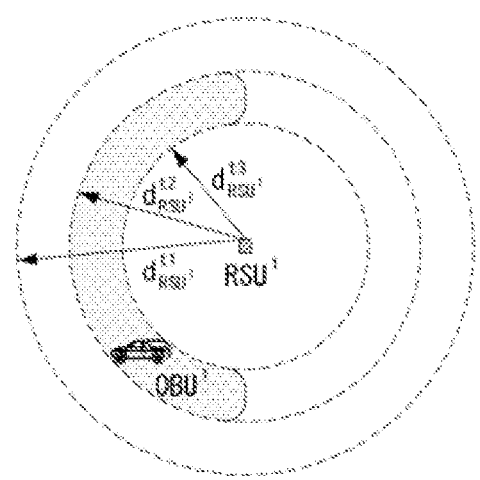
(b) coverage of V2I

[FIG. 23A]

| ASN.1 Representation | | |
|---|---|---|
| DF_OriginalRsuContainer | ::= SEQUENCE{ | |
| timeSteamp | TimeStamelts. | OPTIONAL |
| RsuPosition | ReferencePosition | |
| TransmissionPower | integer | -- unit : -x dbm |
| Coverage | integer | -- unit : 0.1 meter |
| PowerControlList | DF_PowerControlContainer | |
| } | | |

[FIG. 23B]

| ASN.1 Representation | | |
|---|---|---|
| DF_PowerControltainer | ::= SEQUENCE{ | |
| PCIndex | integer | |
| PCInterval | integer | -- unit : 10msec |
| TransmissionPowerList | SEQUENCE(size(1..32))of Integer | -- unit : -x dbm |
| CoverageList | SEQUENCE(size(1..32))of Integer | -- unit : 0.1 meter |
| } | | |

[FIG. 24A]
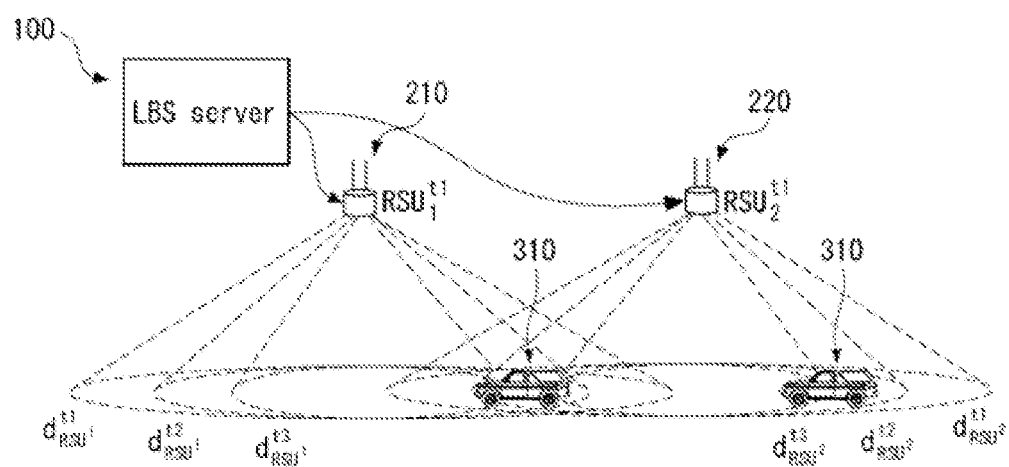
[FIG. 24B]
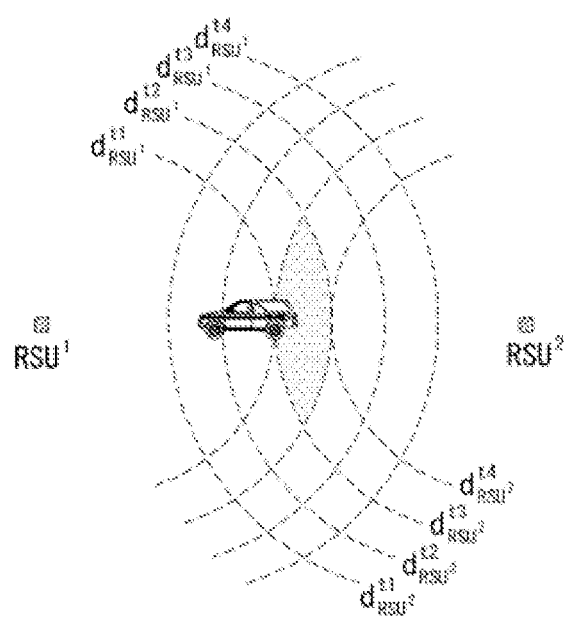

【FIG. 25A】

| ASN.1 Representation | | |
|---|---|---|
| DF_NeighborRsuContainer | ::= SEQUENCE{ | |
|   RsuID | integer | |
|   RsuPos | ReferencePosition | |
|   TransmissionPower | integer | -- unit : -x dbm |
|   Coverage | integer | -- unit : 0.01 meter |
|   PowerControlList | DF_PowerControlContainer | |
| } | | |

【FIG. 25B】

| ASN.1 Representation | | |
|---|---|---|
| DF_PowerControlContainer | ::= SEQUENCE{ | |
|   PCIndex | integer | |
|   PCInterval | integer | |
|   TransmissionPowerList | SEQUENCE(size(1..32))of Integer | -- unit : -x dbm |
|   CoverageList | SEQUENCE(size(1..32))of Integer | -- unit : 0.1 meter |
| } | | |

[FIG. 26]
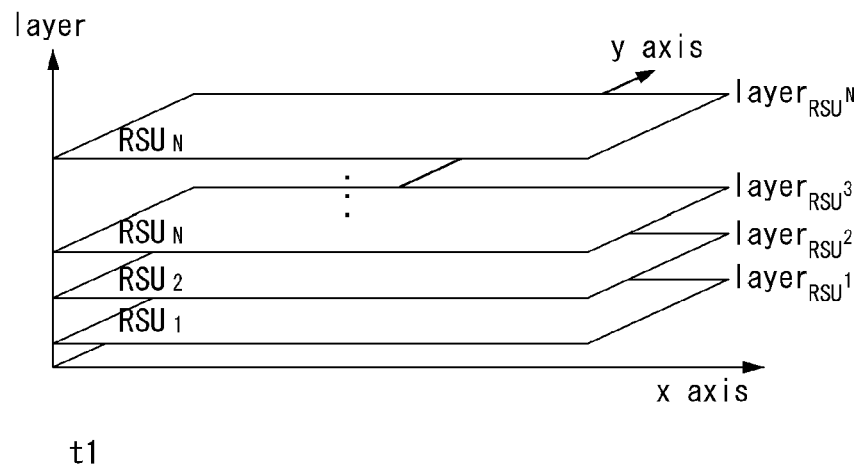
t1
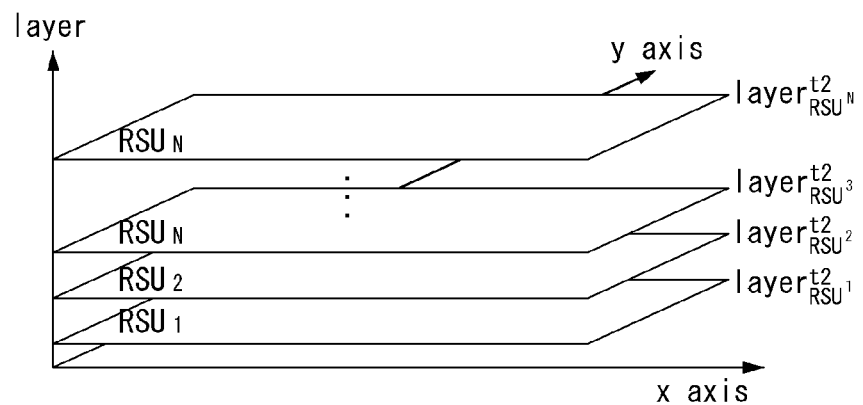
t2

【FIG. 27】

| ASN.1 Representation | | |
|---|---|---|
| DF_NeighborRsuLayerContainer | ::= SEQUENCE{ | |
|    PosReference | ReferencePosition | |
|    angleFromNorth | integer | -- unit : degree |
|    deltaX | integer | -- unit : 0.1 meter |
|    deltaY | integer | -- unit : 0.1 meter |
|    NeighborRsuLayerData | NeighborRsuLayerList | |
|    PCIndex | integer | |
|    PCInterval | integer | |
| } | | |
|    NeighborRsuLayerList ::= SEQUENCE(SIZE(1..10)) OF RsuLayerData | | |
|    RsuLayerData = SEQUENCE(SIZE(1..128))of SEQUENCE(SIZE(1..128))of Integer | | |

[FIG. 28]
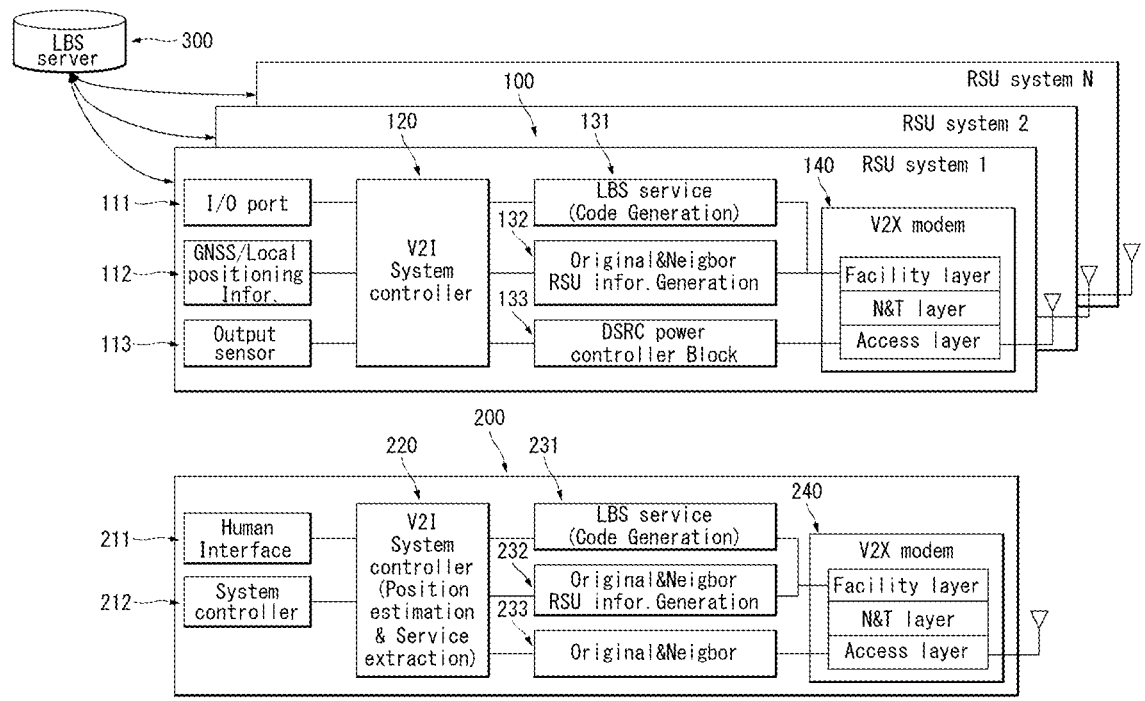

[FIG. 29]
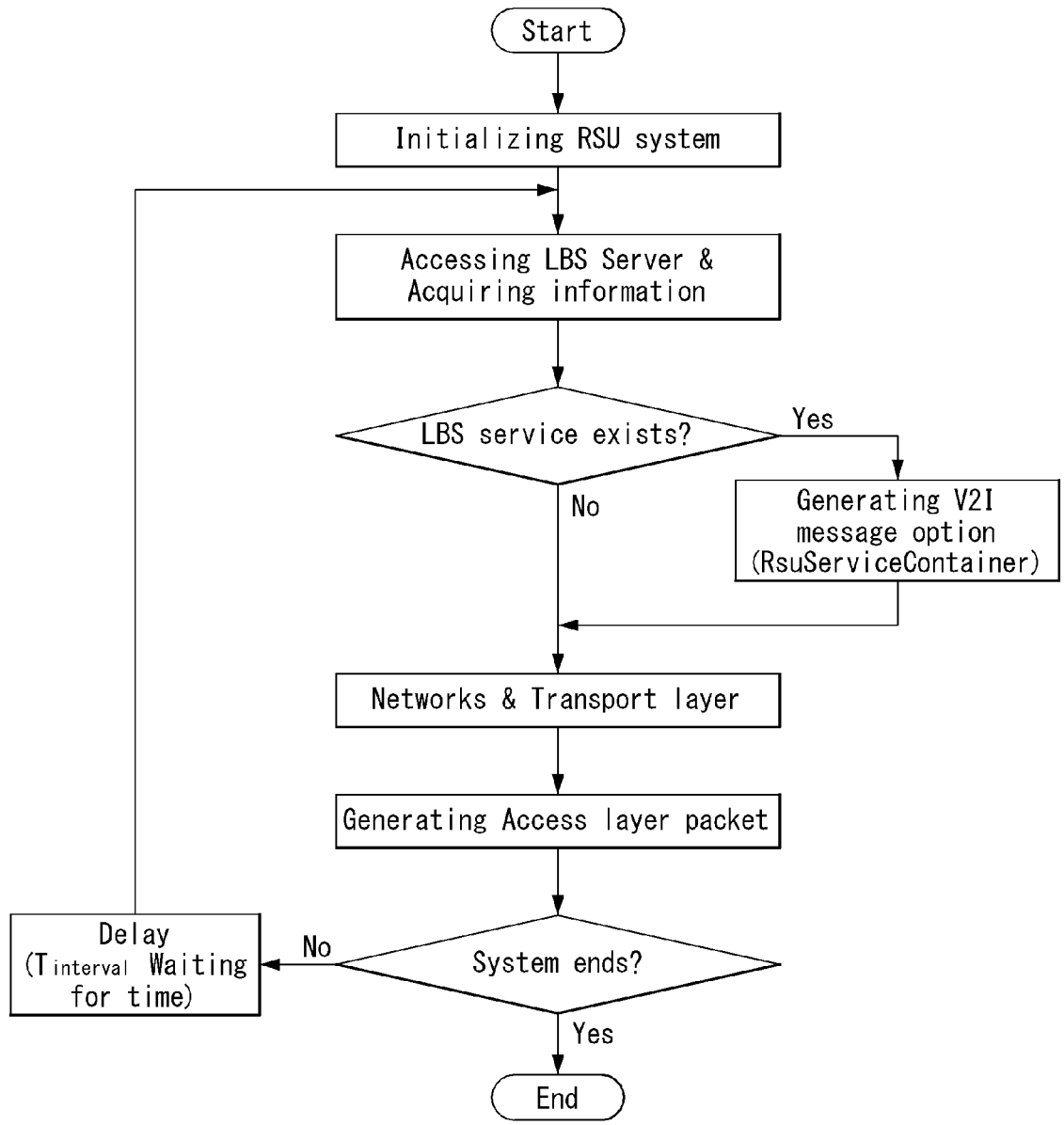

[FIG. 30]
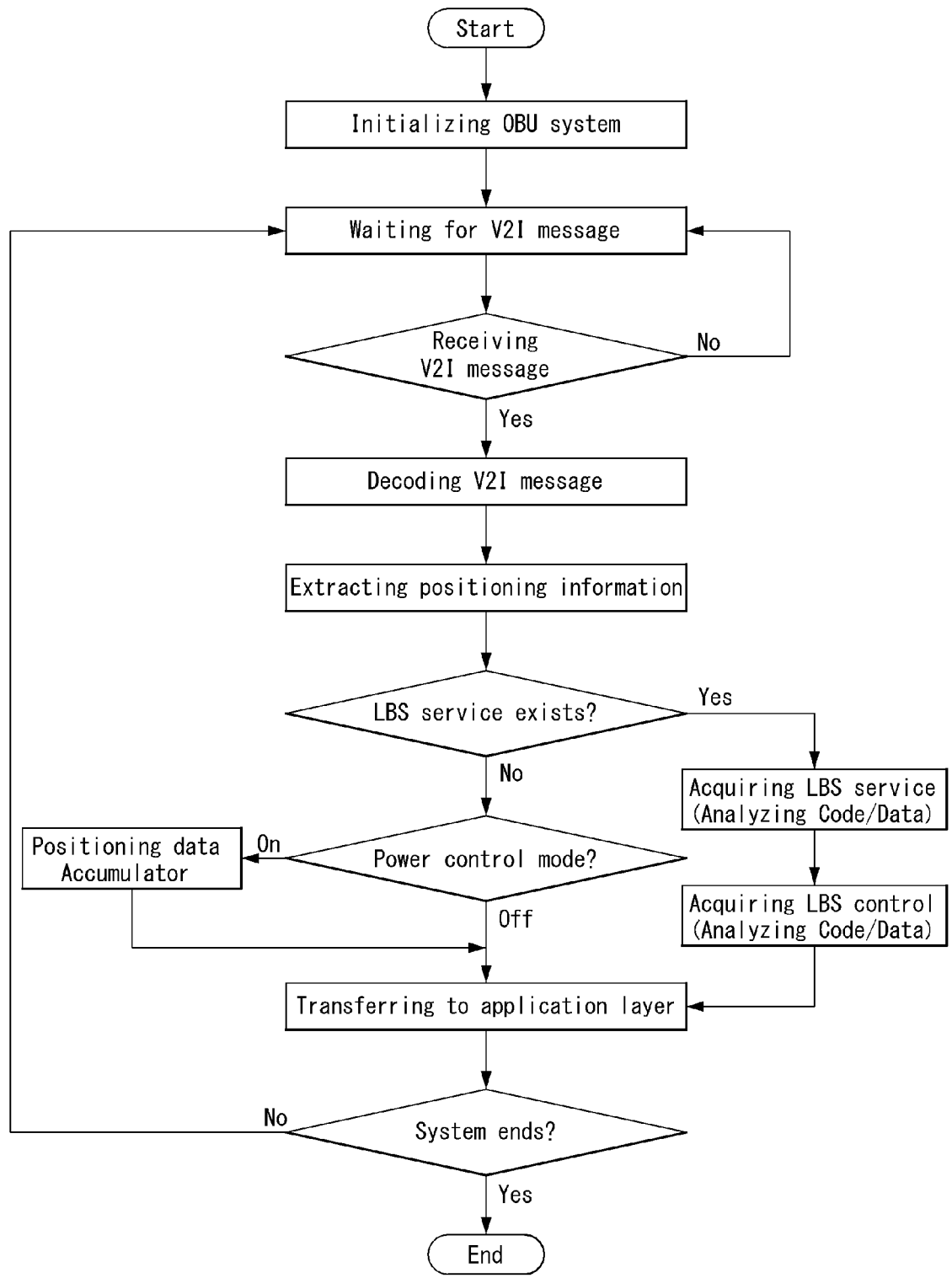

[FIG. 31]
| PCindex | Tx Power | Maximum Coverage | Deteciont state | Deteciont Accumulator |
|---|---|---|---|---|
| 1 | 44dBm | Up to 1000meters | Detected | 10 |
| 2 | 33Bm | Up to 400meters | Detected | 5 |
| 3 | 20dBm | Up to 100meters | Not detected | 5 |
| 4 | 10dBm | Up to 15meters | Not detected | 10 |

[FIG. 32]
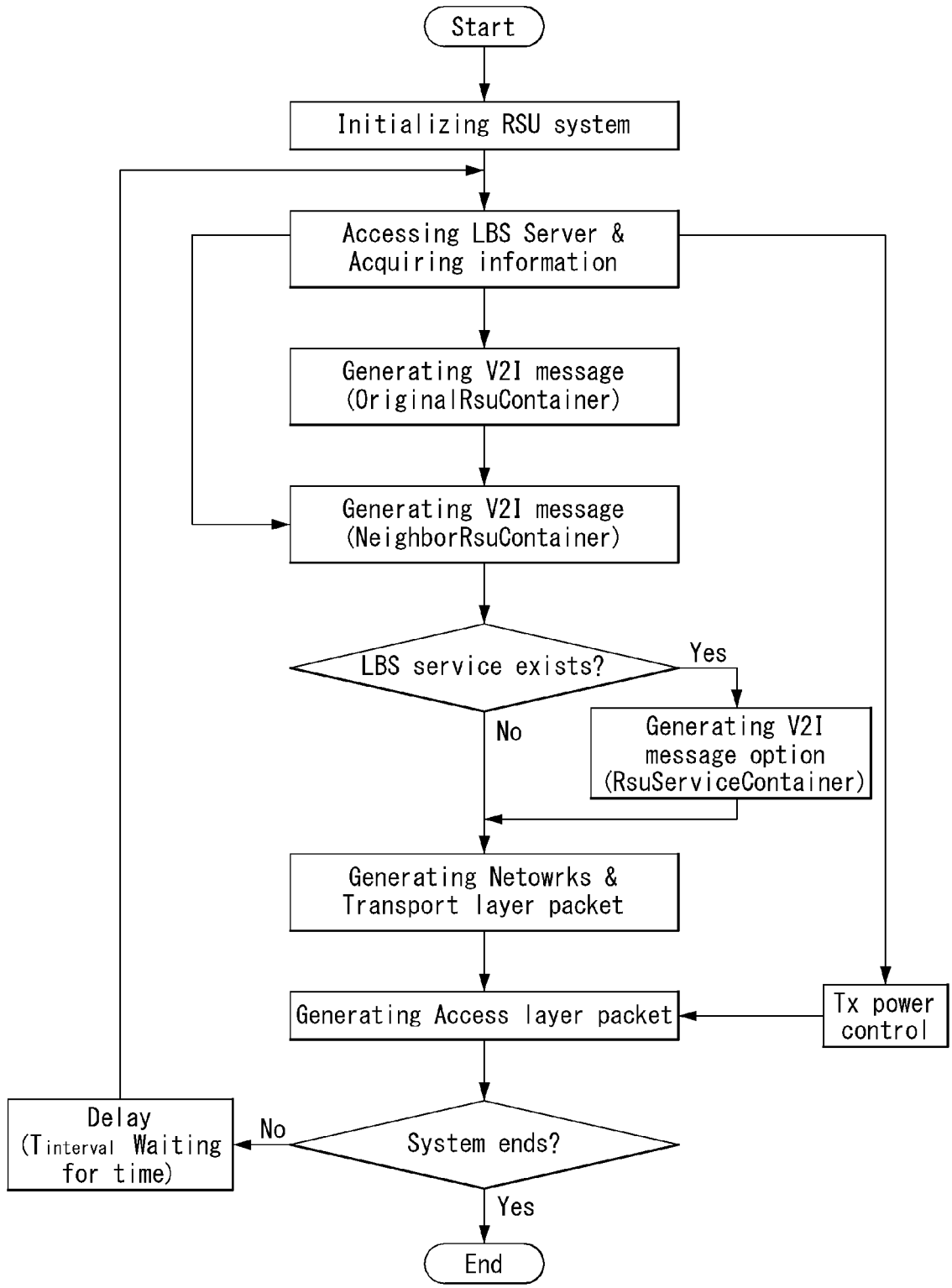

[FIG. 33]
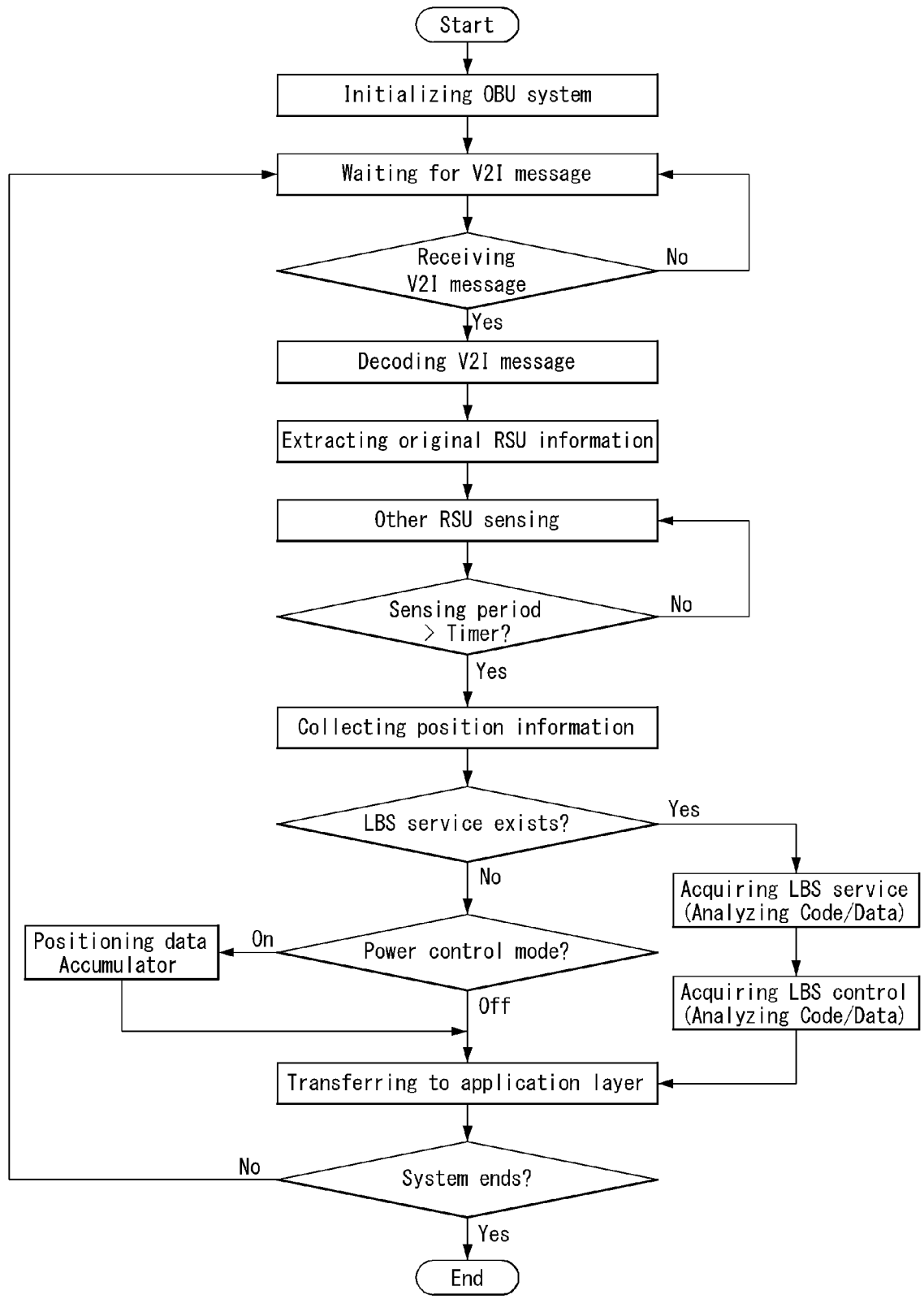

[FIG. 34]
| PCindex | Tx Power | Maximum Coverage | Deteciont state | Deteciont Accumulator | |
|---|---|---|---|---|---|
| | | | | | Neighbor RSU1 |
| | | | | | Neighbor RSU2 |
| 1 | 44dBm | Up to 1000meters | Detected | 10 | Neighbor RSU3 |
| 2 | 33Bm | Up to 400meters | Detected | 5 | |
| 3 | 20dBm | Up to 100meters | Not detected | 5 | |
| 4 | 10dBm | Up to 15meters | Not detected | 10 | |

[FIG. 35]
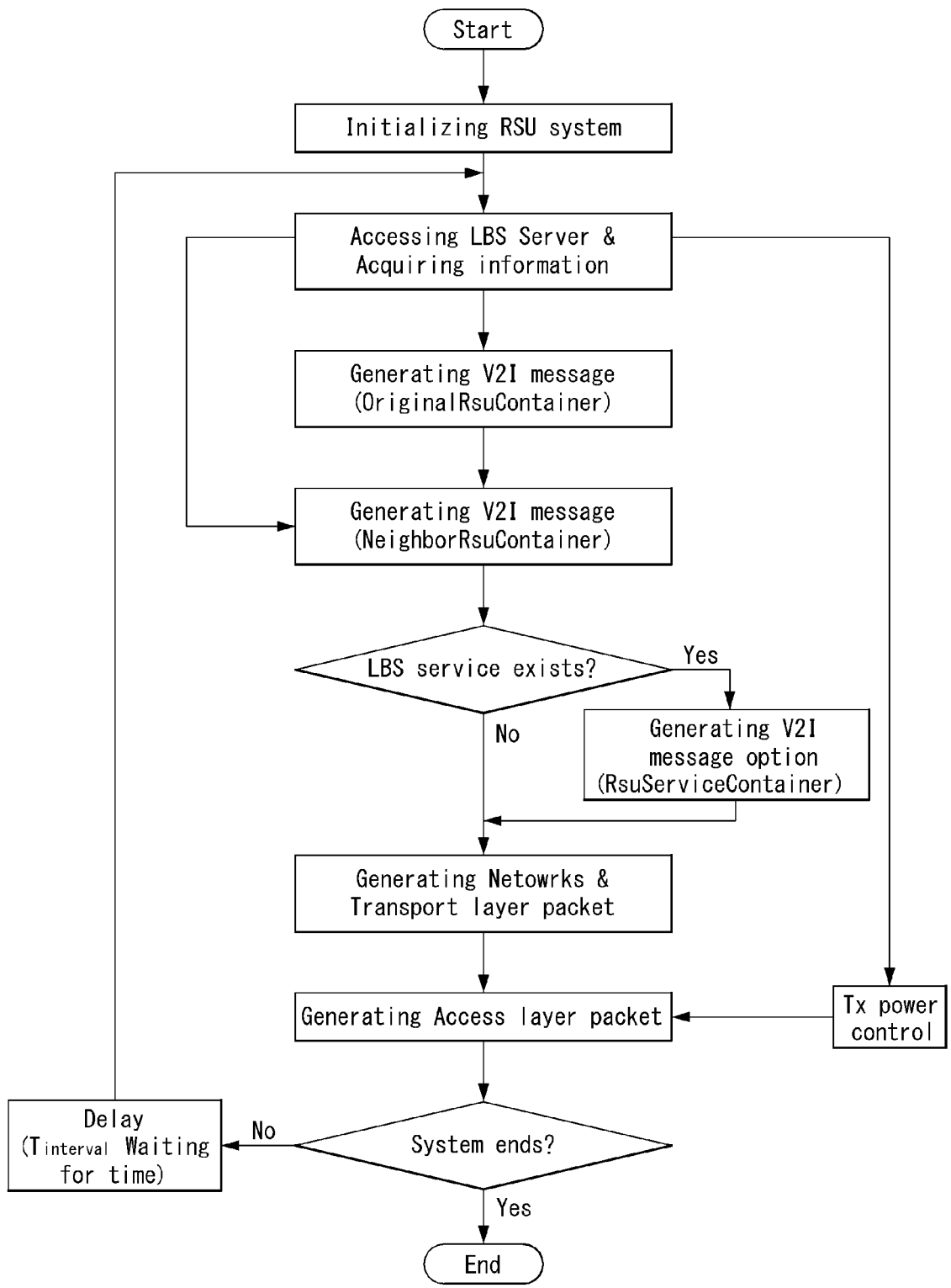

[FIG. 36]
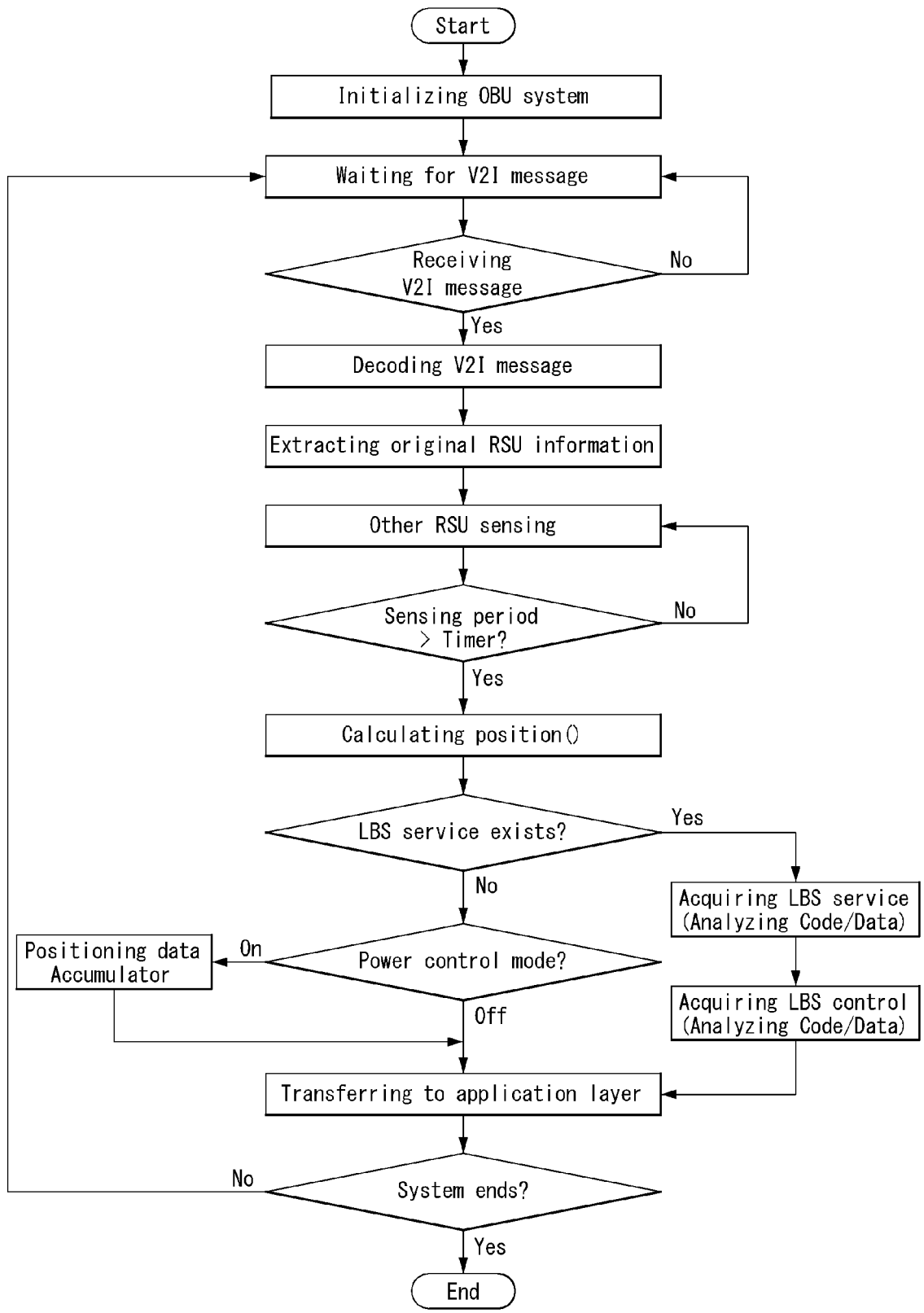

【FIG. 37】
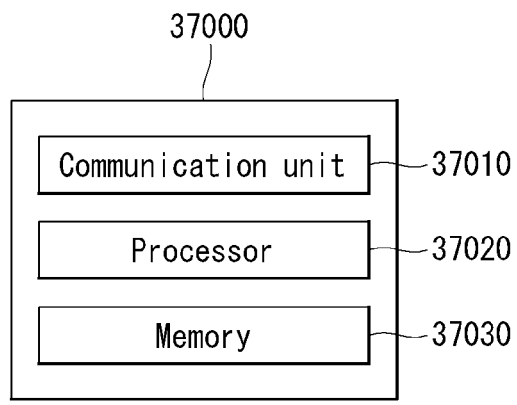
【FIG. 38】
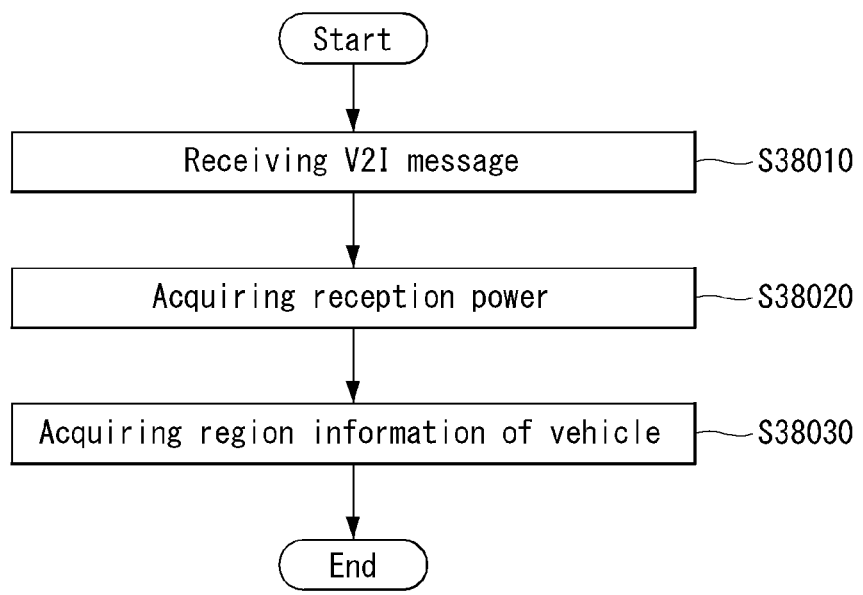

METHOD AND APPARATUS FOR V2X COMMUNICATION

CROSS-REFERENCE TO RELATED APPLICATION

This application is the National Stage filing under 35 U.S.C. 371 of international application no. PCT/KR2018/010516, filed on Sep. 7, 2018, the contents of which are all hereby incorporated by reference herein in their entirety.

TECHNICAL FIELD

The present disclosure relates to an apparatus and method for V2X communication, and particularly, to a method of acquiring position information of a vehicle through V2I communication.

BACKGROUND ART

Recently, a vehicle becomes a product of a complex industrial technology in which electrical, electronic and communication technologies have been converged out of mechanical engineering. In this respect, a vehicle is also called a smart car. The smart car provides various customized mobile services in addition to conventional vehicle technologies, such as traffic safety/congestion solution, by connecting drivers, vehicles, and transportation infrastructure. Such connectivity may be implemented using a vehicle to everything (V2X) communication technology.

DETAILED DESCRIPTION OF INVENTION

Technical Problem

Conventional automobiles use a GPS system using satellites to check their positions. Since the GPS system needs to receive signals from at least three satellites, it is greatly affected by the surrounding environment. Position information cannot be used in indoor environments where GPS signals are not received, such as tunnels or underground parking lots. In addition, even when the weather is bad or when driving in an urban area with many buildings, position recognition performance is attenuated.

The position recognition technology using inertial navigation is used as a compensation technology in areas where GPS does not operate. However, this technology is a system in which position errors may be accumulated, and may rather deteriorate the position recognition performance. There is a need to develop a technology to improve the above problems and improve the position recognition performance of the V2I device in an environment where GPS signals are not normally received.

Technical Solution

In order to solve the above technical problem, the present disclosure proposes a method and apparatus for V2X communication.

A method of acquiring position information of a vehicle through V2I communication according to an embodiment of the present disclosure, in a method of acquiring position information of a vehicle through V2I communication, includes receiving a first V2I message including position information, transmission power information, and coverage information of a first road side unit (RSU) from the first RSU; acquiring reception power of the first V2I message; and acquiring region information of the vehicle based on the reception power and the coverage information, wherein the region information may indicate (1) whether the vehicle is located within the coverage of the first RSU or (2) a specific region within the coverage of the first RSU.

As an embodiment, the V2I message may further include neighboring RSU information, and the region information is acquired based on the reception power, the coverage of the first RSU, and coverage of the neighboring RSU.

As an embodiment, the neighboring RSU information includes position information, transmission power information, and coverage information of a second RSU having a coverage region overlapping the coverage of the first RSU.

As an embodiment, the region information is determined based on whether the specific region includes the overlapping coverage region based on whether or not to receive a second V2I message transmitted from the second RSU.

As an embodiment, the neighboring RSU information includes position information and layer data of the neighboring RSU, wherein the layer data represents received signal strength indication (RSSI) table information in a predefined region.

As an embodiment, the V2I message further includes at least one of a list of transmission power of the first RSU, a control interval of the transmission power, or coverage information corresponding to the transmission power.

As an embodiment, the acquiring region information of the vehicle further includes checking whether to receive a third V2I message transmitted from the first RSU during the control interval, and the region information is determined based on whether the specific region includes a coverage region corresponding to a changed transmission power depending on whether or not to receive the third V2I message during the control interval.

A V2X communication device of acquiring position information of a vehicle through V2I communication according to an embodiment of the present disclosure includes a memory configured to store data; a communication unit configured to transmit and receive a radio signal including a V2I message; and a processor configured to control the memory and the communication unit, wherein the processor is configured to receive a first V2I message including position information, transmission power information, and coverage information of a first road side unit (RSU) from the first RSU, acquire reception power of the first V2I message, and acquire region information of the vehicle based on the reception power and the coverage information, wherein the region information indicates (1) whether the vehicle is located within the coverage of the first RSU or (2) a specific region within the coverage of the first RSU.

As an embodiment, the V2I message may further include neighboring RSU information, and the region information is acquired based on the reception power, the coverage of the first RSU, and coverage of the neighboring RSU.

As an embodiment, the neighboring RSU information includes position information, transmission power information, and coverage information of a second RSU having a coverage region overlapping the coverage of the first RSU.

As an embodiment, the region information is determined based on whether the specific region includes the overlapping coverage region based on whether or not to receive a second V2I message transmitted from the second RSU.

As an embodiment, the neighboring RSU information includes position information and layer data of the neighboring RSU, wherein the layer data represents received signal strength indication (RSSI) table information in a predefined region.

As an embodiment, the V2I message further includes at least one of a list of transmission power of the first RSU, a control interval of the transmission power, or coverage information corresponding to the transmission power.

As an embodiment, the processor checks whether to receive a third V2I message transmitted from the first RSU during the control interval, and the region information is determined based on whether the specific region includes a coverage region corresponding to a changed transmission power depending on whether or not to receive the third V2I message during the control interval.

Advantageous Effects

According to an embodiment of the present disclosure, it is possible to effectively acquire position information of a vehicle in an environment in which the GPS reception rate is poor.

In addition, according to an embodiment of the present disclosure, the resolution of position recognition can be improved by subdividing the recognition region through redundant arrangement of load side units or transmission power control.

DESCRIPTION OF DRAWINGS

The accompany drawings which are included for further understanding of the disclosure and included in this disclosure and which form part of the disclosure illustrate embodiments of the disclosure along with the detailed description that describes the principle of the disclosure.

FIG. 1 illustrates exemplary architecture of a V2X communication device according to an embodiment of the disclosure.

FIG. 2 illustrates a method of processing a V2X message according to an embodiment of the disclosure.

FIG. 3 illustrates architecture of a V2X communication device that provides an infrastructure service according to an embodiment of the present disclosure.

FIG. 4 is a diagram illustrating a method of acquiring position information in an indoor environment from a stand-alone-based RSU as an embodiment to which the present disclosure is applied.

FIG. 5 is a diagram illustrating a method of acquiring position information in an indoor environment from a stand-alone-based RSU as an embodiment to which the present disclosure is applied.

FIG. 6 is a diagram showing a structure of an indoor positioning message (IPM) according to an embodiment of the present disclosure.

FIGS. 7A to 7C are diagrams illustrating a data frame structure of an indoor positioning message (IPM) according to an embodiment of the present disclosure.

FIG. 8 is a diagram for describing a method of acquiring position information of a vehicle based on information of a road side unit (RSU) as an embodiment to which the present disclosure is applied.

FIGS. 9A and 9B are diagrams for describing a method of acquiring position information of a vehicle based on information on a neighboring road side unit (RSU) as an embodiment to which the present disclosure is applied.

FIG. 10 is a diagram for describing a method of acquiring position information of a vehicle based on information on a neighboring road side unit (RSU) as an embodiment to which the present disclosure is applied.

FIGS. 11A and 11B are diagrams for describing a method of acquiring position information of a vehicle based on information on a neighboring road side unit (RSU) as an embodiment to which the present disclosure is applied.

FIG. 12 is a diagram for describing a method of acquiring position information of a vehicle based on information on a neighboring road side unit (RSU) as an embodiment to which the present disclosure is applied.

FIG. 13 is a diagram illustrating an indoor positioning message (IPM) structure including information on a neighboring load side unit (RSU) according to an embodiment of the present disclosure.

FIGS. 14A and 14B are diagrams illustrating a data frame structure of an indoor positioning message (IPM) including information on a load side unit (RSU) according to an embodiment of the present disclosure.

FIG. 15 is a diagram for describing a method of acquiring position information of a vehicle based on reception power level information as an embodiment to which the present disclosure is applied.

FIG. 16 is a diagram for describing a method of acquiring position information of a vehicle based on reception power level information as an embodiment to which the present disclosure is applied.

FIG. 17 is a diagram for describing a method of acquiring position information of a vehicle based on layer information including a reception power level table as an embodiment to which the present disclosure is applied.

FIG. 18 is a diagram for describing a method of acquiring position information of a vehicle based on layer information including a reception power level table as an embodiment to which the present disclosure is applied.

FIG. 19 is a diagram illustrating an indoor positioning message (IPM) structure including layer information of a load side unit (RSU) according to an embodiment of the present disclosure.

FIGS. 20A and 20B are diagrams illustrating a data frame structure of an indoor positioning message (IPM) including layer information of a load side unit (RSU) according to an embodiment of the present disclosure.

FIGS. 21A and 21B are diagrams illustrating a method of acquiring position information through transmission power control as an embodiment to which the present disclosure is applied.

FIGS. 22A and 22B are diagrams illustrating a method of acquiring position information through transmission power control of a stand-alone-based RSU as an embodiment to which the present disclosure is applied.

FIGS. 23A and 23B are diagrams illustrating a data frame structure of an indoor positioning message (IPM) including transmission power control information according to an embodiment of the present disclosure.

FIGS. 24A and 24B are diagrams illustrating a method of acquiring position information through transmission power control of a V2I message including neighboring RSU information as an embodiment to which the present disclosure is applied.

FIGS. 25A and 25B are diagrams illustrating a data frame structure of an indoor positioning message (IPM) including transmission power control information according to an embodiment of the present disclosure.

FIG. 26 is a diagram illustrating a method of acquiring position information through transmission power control of a V2I message including RSU layer information as an embodiment to which the present disclosure is applied.

FIG. 27 is a diagram illustrating a data frame structure of an indoor positioning message (IPM) including transmission power control information according to an embodiment of the present disclosure.

FIG. 28 is a diagram illustrating a V2I system structure according to an embodiment of the present disclosure.

FIG. 29 is a flowchart illustrating a method of transmitting a V2I message by an RSU in a stand-alone method according to an embodiment of the present disclosure.

FIG. 30 is a flowchart illustrating a method of estimating position information of a vehicle based on a V2I message received from an RSU in a stand-alone method according to an embodiment of the present disclosure.

FIG. 31 is a diagram illustrating a power control accumulation table according to transmission power control according to an embodiment of the present disclosure.

FIG. 32 is a flowchart illustrating a method of transmitting a V2I message including neighboring RSU information according to an embodiment of the present disclosure.

FIG. 33 is a flowchart illustrating a method of estimating position information of a vehicle based on a V2I message including neighboring RSU information according to an embodiment of the present disclosure.

FIG. 34 is a diagram illustrating a power control accumulation table according to transmission power control according to an embodiment of the present disclosure.

FIG. 35 is a flowchart illustrating a method of transmitting a V2I message including RSU layer information according to an embodiment of the present disclosure.

FIG. 36 is a flowchart illustrating a method of estimating position information of a vehicle based on a V2I message including neighboring RSU information according to an embodiment of the present disclosure.

FIG. 37 illustrates a configuration of a V2X communication device according to an embodiment of the present disclosure.

FIG. 38 is a flowchart illustrating a method of acquiring position information from a V2I message by a V2X communication device according to an embodiment of the present disclosure.

BEST MODE FOR INVENTION

Preferred embodiments of the disclosure will be described in detail with reference to the accompanying drawings. The following detailed description with reference to the accompanying drawings is to illustrate preferred embodiments of the disclosure rather than illustrate only embodiments that can be implemented according to embodiments of the disclosure. The following detailed description includes details in order to provide the full understanding of the disclosure, but the disclosure does not require all of these details. The embodiments described below need not be separately used. A plurality of embodiments or all embodiments may be together used, and specific embodiments may be used in combination with each other.

Most of the terms used in this disclosure are selected from common ones widely used in the corresponding field, but some terms are arbitrarily selected by the applicant and the meaning thereof will be described in detail in the following description as necessary. Therefore, the disclosure should be understood based on the intended meanings of the terms rather than the simple names or meanings of the terms.

The disclosure relates to a V2X communication device. The V2X communication device is included in an intelligent transport system (ITS), and may perform some of or all the functions of the ITS system. The V2X communication device may perform communication between a vehicle and a vehicle, a vehicle and infrastructure, a vehicle and a bicycle, or with a mobile device. In one embodiment the V2X communication device may correspond to the on board unit (OBU) of a vehicle or may be included in an OBU. The OBU may be referred to as an on board equipment (OBE). The V2X communication device may correspond to a road side unit (RSU) of infrastructure or may be included in an RSU. The RSU may be referred to as roadside equipment (RSE). Alternatively, the V2X communication device may correspond to an ITS station or may be included in an ITS station. All of given OBU, RSU and mobile equipment that perform V2X communication may be referred to as ITS stations. Alternatively, the V2X communication device may correspond to a wireless access in vehicular (WAVE) apparatus or may be included in a WAVE apparatus. The V2X communication device may be abbreviated as a V2X apparatus.

FIG. 1 is a view illustrating an exemplary architecture of an V2X communication device according to an embodiment of the disclosure. FIG. 1 may be an exemplary architecture of a V2X communication device that may be implemented based on, for example, the reference architecture of an ITS station compliant with the EU standard.

Application layer: The application layer may implement and support various use cases. For example, an application may provide road safety, efficient traffic information, and other application information.

Facilities layer: The facilities layer may support effective implementation of various usage examples defined in the application layer.

This facilities layer may basically support the same or similar functions as the upper three layers of an OSI model. In addition, facilities for the V2X communication device may be provided. For example, the facilities layer may provide facilities such as application support, information support, and session/communication support. Here, the facilities refer to a component that provides functionality, information, and data. The three facilities proposed as an example will be described as follows.

The application support facility refers to a facility that supports a basic application set (or message set). In the case of the V2X communication device of FIG. 1, the facilities layer may support V2X messages/ITS messages, for example, a periodic message such as CAM or an event message such as Decentralized Environmental Notification Messages (DENM). The facilities layer may also support, for example, CPM messages.

The information support facility may be a facility that provides common data information or database used for a basic application set (or message set), and may be, for example, a Local Dynamic Map (LDM).

The session/communication support facility is a facility that provides services for communication and session management, and may be an addressing mode, a session support and the like.

As described above, the facilities layer supports the application set (or message set) as one of main functions thereof. That is, the facilities layer performs a role of generating a message set (or message) based on information to be transmitted or a service to be provided by the application layer. The generated message may be referred to as an V2X message/ITS message, which will be described in detail below with reference to the accompanying drawings.

Access layer: The access layer may transmit the message/data received at the upper layers through a physical channel. For example, the access layer may perform/support data communication, based on an IEEE 802.11 and/or 802.11p standards-based communication technology, an ITS-G5 wireless communication technology based on a physical transmission technology of the IEEE 802.11 and/or 802.11p standards, a 2G/3G/4G (LTE)/5G wireless cellular communication technology including satellite/broadband wireless mobile communication, a broadband terrestrial digital broadcasting technology such as DVB-T/T2/ATSC, a GPS technology, and an IEEE 1609 WAVE technology.

Network and Transport Layer: The network/transport layer may configure a network for vehicle communication between homogenous/heterogeneous networks, by using various transport protocols and network protocols.

The transport layer is a connection layer between services provided by the upper layers (session layer, presentation layer, and application layer) and the lower layers (network layer, data link layer, and physical layer). The transport layer may manage the transmitted data to exactly arrive at a destination. At the transmitting side, the transport layer may process the data into packets of an appropriate size for efficient data transmission, and at the receiving side, the transport layer may perform processing to recover the received packets to the original file. In an embodiment, protocols such as Transmission Control Protocol (TCP), User Datagram Protocol (UDP), and Basic Transport Protocol (BTP) may be used as a transport protocol.

The network layer may manage the logical address, and may determine the delivery path of the packet. The network layer may receive the packet generated in the transport layer, and may add the logical address of the destination to a network layer header. In an embodiment, the packet path may be considered for unicast/broadcast between vehicles, between vehicles and fixed stations, and between fixed stations. In an embodiment, geo-networking, IPv6 networking with mobility support, and IPv6 over geo-networking may be considered as the networking protocol.

The exemplary architecture of V2X communication device may further include a management layer and a security layer.

FIG. 2 is a view illustrating a method of processing a V2X message according to an embodiment of the disclosure.

As described above, the application layer or the facilities layer may generate a V2X message. For example, a CAM, a DENM, or a CPM message may be generated as the V2X message.

The transport layer may generate a BTP packet, and the network layer may encapsulate the BTP packet to generate a GeoNetworking packet. The GeoNetworking packet may be encapsulated into an LLC packet. In the embodiment of FIG. 2, the data may include a message set, and the message set may become a basic safety message.

BTP is a protocol for transmitting the V2X message generated in a facilities layer to a lower layer. A BTP header includes A type and B type. The A type BTP header may include a destination/destination port and a source port, which are necessary for transmission/reception in interactive packet transmission. The B type header may include destination port and destination port information necessary for transmission in non-interactive packet transmission. A description of fields/information included in the header is as follows.

Destination Port: The destination port identifies a facility entity corresponding to the destination of the data (BTP-PDU) included in the BTP packet.

Source Port: As a field generated in the case of the BTP-A type, the sound port indicates the port of the protocol entity of the facilities layer at a source to which the corresponding packet is transmitted. This field may have a size of 16 bits.

Destination Port Info: As a field generated in the case of the BTP-B type. The destination port info may provide additional information when the destination port is the most well-known port. This field may have a size of 16 bits.

The GeoNetworking packet includes a basic header and a common header according to the protocol of the network layer, and selectively includes an extension header according to the geo networking mode. The GeoNetworking header will be again described below.

An LLC header is added to the GeoNetworking packet to generate an LLC packet. The LLC header provides a function of distinguishing and transmitting IP data and GeoNetworking data. The IP data and the GeoNetworking data may be distinguished by Ethertype of SNAP. In an embodiment, when IP data is transmitted, the Ether type may be set to 0x86DD and included in the LLC header. In an embodiment, when GeoNetworking data is transmitted, the Ether type may be set to 0x86DC and included in the LLC header. A receiver may check the Ethertype field of the LLC packet header, and may forward and process the packet to the IP data path or the GeoNetworking path according to the value of the Ethertype field of the LLC packet header.

FIG. 3 is a view illustrating an exemplary architecture of a V2X communication device providing a CP service according to an embodiment of the disclosure.

The V2X communication device may provide various services for traffic safety and efficiency. One of the services may be a Cooperative Awareness (CA) service. The Cooperative Awareness in road traffic means that road users and roadside infrastructures can know mutual positions, dynamics and attributes. Here, the road users may be all kinds of users on a road or near a road, which act as traffic safety and control, such as a vehicle, a truck, a motorcycle, a bicycle or a pedestrian, and the roadside infrastructures may be equipment including a road sign, a traffic light or a barrier and an entrance.

This awareness of each other becomes basics of many road safety and traffic efficiency applications. This can be performed by regular exchange of information between road users at vehicle to vehicle (V2V), vehicle to infrastructure (V2I), infrastructure to vehicle (I2V) or everything to everything (X2X) which are based on a wireless network called a V2X network.

On this other hand, the cooperative safety and traffic efficiency applications require the V2X communication device to develop situational awareness that includes the presence and behavior of road users around the V2X communication device. For example, the V2X communication device may develop situational awareness through communication with its own sensors and other V2X communication devices.

An infrastructure service may designate whether the V2I communication device of the RSU may notify other V2X communication devices about positions, dynamics and characteristics of the detected neighboring road users and other objects. For example, the infrastructure service may share this information with other V2X communication devices through transmission of an indoor positioning message (IPM). This infrastructure service may be an optional facility for all types of V2X communication devices (vehicle V2X communication device, RSU V2X communication device, personal V2X communication device, etc.) participating in road traffic.

V2I technology is about communication technology between an infrastructure and a vehicle among V2X. In the present disclosure, the infrastructure represents a fixed communication device that performs V2X communication. For example, it may be a traffic light or a communication device installed at an intersection. The infrastructure may be referred to as a road side unit (RSU). The V2I technology includes "Traffic Light Maneuver" technology that informs driving availability information such a traffic light through the RSU connected to the network, "Toad and Lane Topology" technology that informs road conditions and lane composition, "Infrastructure to Vehicle information" technology that informs the vehicle of road condition information, "Traffic Light control" technology that manages signals, etc.

As shown in FIG. 3, the ITS system provides a system corresponding technology through the infrastructure service in a facility layer as shown in the drawing below. That is, the infrastructure service may be a facility layer entity. For example, the infrastructure service may be a part of the application support domain of the facility layer. FIG. 3 exemplarily illustrates the infrastructure service in V2X communication device architecture and a logical interface for other layers and a potential logical interface for entities in the facility layer.

When transmitting, the facility layer generates/encodes a message according to an operation requested by an application, and manages the transmission of the message. When receiving, the facility layer decodes the message received through the NF-SAP at the network and transport (N&T: Network & Transport) layer and transmits the received message to the application layer. Information by message management is connected to the management layer through MF-SAP, and is connected to the security layer through SF-SAP for message security.

This infrastructure service may provide two services, for example, sending and receiving of IPM. The sending of IPM includes generation and transmission of IPM. In the IPM generation process, an originating V2X communication device configures the IPM, and then it is delivered to the networking and transport layers for dissemination. In the present disclosure, the originating V2X communication device may be referred to as a sending V2X communication device, a transmission V2X communication device, a host V2X communication device, and the like.

On the other hand, in order to collect related information for IPM generation and to deliver the received IPM content for further processing, the infrastructure service may interface with other entities of the facility layer and V2X applications within the layer.

Conventional automobiles use a GPS system using satellites to check their positions. Since the GPS system needs to receive signals from at least three satellites, it is greatly affected by the surrounding environment. Position information cannot be used in indoor environments where GPS signals are not received, such as tunnels or underground parking lots. In addition, even when the weather is bad or when driving in an urban area with many buildings, position recognition performance is attenuated.

Position recognition technology using inertial navigation is used as a compensation technology in areas where GPS does not operate. However, this technology is a system in which position errors can be accumulated, and may rather deteriorate the position recognition performance. Therefore, in order to improve this problem and increase the position recognition performance of the V2I device in an environment where GPS signals are not normally received, the present disclosure proposes a method of effectively acquiring position information of a vehicle through V2I communication in an indoor environment where GPS signals are not received.

FIG. 4 is a diagram illustrating a method of acquiring position information in an indoor environment from a stand-alone-based RSU as an embodiment to which the present disclosure is applied.

Referring to FIG. 4, an RSU installed in an indoor environment where GPS does not operate may provide a location-based service. For example, GPS reception is impossible in a tunnel environment as shown in FIG. 4. In this case, the RSU installed along the central lane in the tunnel may transmit position information of the vehicle in the tunnel to a vehicle passing through an region allocated to the RSU through V2I communication. Here, the position information of the vehicle may include a reference position, a position of the RSU, and information on a coverage region of the RSU.

That is, in the tunnel environment, the V2X vehicle may not receive GPS, so it cannot acquire accurate position information, but may acquire information on a zone to which its own vehicle belongs from an adjacent RSU through V2I communication. For example, the information on the zone may indicate whether the vehicle is located within the coverage of the RSU.

In addition, it is also possible to provide not only a position recognition service that simply provides position information, but also safety information and convenience services specialized for the position. This additional location-based service will be described in detail later.

FIG. 5 is a diagram illustrating a method of acquiring position information in an indoor environment from a stand-alone-based RSU as an embodiment to which the present disclosure is applied.

Referring to FIG. 5, an RSU installed in an indoor environment where GPS does not operate may provide a location-based service. For example, GPS reception is weak or GPS reception is impossible in a parking lot environment as shown in FIG. 5. In this case, the position information on the region to which the vehicle belongs among the regions based on each RSU may be transmitted to the vehicle. Here, the position information of the vehicle may include a reference position, a position of the RSU, and information on a coverage region of the RSU.

In addition, it is also possible to support not only a position recognition service that simply provides position information, but also safety information and user-convenience services specialized for the position. This additional location-based service will be described in detail later.

The present disclosure proposes a block of a facility layer that supports an indoor positioning service (IPS) in an RSU device through V2I communication.

In an embodiment of the present disclosure, a transmitter may generate an indoor positioning message (IPM) message according to the operation of an upper application for indoor position service in the facility layer. In addition, the generated message may be transmitted to a network & transport layer. After receiving the V2X message, a receiver may decode the IPM message received from the layer to the networks & transport layer and transmit related data to the corresponding application to a higher layer.

FIG. 6 is a diagram showing a structure of an indoor positioning message (IPM) according to an embodiment of the present disclosure.

Referring to FIG. 6, the IPM message may include an ITS protocol data unit (PDU) header and a plurality of containers.

The ITS PDU header is a common header including information on a protocol version, message type, and ITS ID of the originating V2X communication device. The ITS PDU header is a common header used in an ITS message and exists at the beginning of the ITS message. The ITS PDU header may be referred to as a common header or a header.

The plurality of containers may include an originating RSU container (OriginalRsuConatiner) including position information of the RSU and/or a service container (RsuServiceContainer) defining services provided at the position.

FIGS. 7A to 7C are diagrams illustrating a data frame structure of an indoor positioning message (IPM) according to an embodiment of the present disclosure.

Referring to FIGS. 7A to 7C, the configuration of an IPS message is expressed as ASN.1 and may be defined in a standard document, and may be transmitted/received based on this.

Referring to FIG. 7A, the IPS message is defined as a sequence and may include a header, an originating RSU container (OriginalRsuConatiner), and a service container (RsuServiceContainer).

In this embodiment, the data frame structure of the outgoing RSU container may be defined as shown in FIG. 7B. That is, the originating RSU container may include a timestamp (TimeSteamp) indicating the transmission time of the message, RSU position (RsuPosition) indicating the installation position of the RSU, additionally, transmission power (transmissionPower) used for position recognition in the receiver and/or a coverage (Coverage) parameter (or DF) indicating a region in which a signal of the RSU is transmitted.

Transmission power parameters may be expressed as integers, and the unit may be −xdBm. For example, when a value of the transmission power parameter is 75, it indicates that the RSU transmitted a message with a power of −75 dBm. The coverage parameter is a radius based on RSU and may be expressed as an integer, and the unit may be 0.1 meter. For example, when a value of the coverage parameter is 300, it indicates that the signal of the RSU is transmitted up to a radius of 30 meters around the reference position (i.e. the position of the RSU). If the receiver receives a signal transmitted from the corresponding RSU, it may be estimated that its own vehicle exists within a 30-meter radius of the reference position.

In this embodiment, the data frame structure of the service container may be defined as shown in FIG. 7C. The service container may include zone ID (ZoneID) indicating identification information of a zone (or region) where location-based services are provided, zone name (ZoneName), a service type (ServiceType) indicating the type of service provided, service data (ServiceData) including information related to the corresponding service, a control type (ControlType) indicating the type of control service for vehicle safety and/or a control data (ControlData) parameter (or DF) including information related to the corresponding control service.

For example, assuming that a service that informs map information of an underground parking lot is provided, the service type may indicate a value corresponding to the corresponding parking lot, and the service data may include the map information of the corresponding parking lot. In addition, a location-based control service may be provided through control type and/or control data for vehicle safety. For example, when there is no parking space on the corresponding floor at the entrance (Zone) of the underground parking lot, the RSU in the corresponding region may transmit control data including guide information corresponding to the control type to use the next layer. Detailed embodiments for this will be described later in detail.

FIG. 8 is a diagram for describing a method of acquiring position information of a vehicle based on information of a road side unit (RSU) as an embodiment to which the present disclosure is applied.

Referring to FIG. 8, the RSU may be installed to have coverage overlapping with at least one neighboring RSU. As shown in FIG. 8, if stand-alone-based RSUs are installed overlapping, when a vehicle is located in an area (i.e. regions such as r12, r23, r34, r45, etc.) where a V2I message is received from a plurality of RSUs, such as a hatched region, it is possible to estimate a more precise position. However, when only each originating RSU information is received from the RSU, there may be an uncertain area in terms of positioning the position.

For example, when a vehicle is located in an overlapping coverage region such as r12, r23, r34, r45, etc., it is possible to estimate a relatively more precise position by receiving the V2I messages from two RSUs, but when the vehicle is located outside the r12 region within the r1 region, it is difficult to limit to a specific region within the r1 region (that is, estimate the position to the r1 region excluding the r12 region).

Accordingly, in an embodiment of the present disclosure, in consideration of this point, a technique for improving indoor positioning through transmission of neighbor RSU information is proposed for more precise position recognition (or position estimation). That is, each RSU may transmit a V2I message including information on neighboring RSUs having overlapping coverage.

FIGS. 9A and 9B are diagrams for describing a method of acquiring position information of a vehicle based on information on a neighboring road side unit (RSU) as an embodiment to which the present disclosure is applied.

Referring to FIG. 9A, it is assumed that an existing stand-alone method is applied and a first on-board unit (OBU) is located as shown in FIG. 9A. In this case, the first OBU does not receive a signal from a second RSU, which is an RSU around a first RSU.

Accordingly, the entire coverage of the first RSU including all of the overlapping areas (e.g. RSU12, RSU13, RSU14, RSU15) without distinction for this may be recognized as a region in which the first OBU exists. In other words, when a V2I message including only the information of the originating RSU is received from the first RSU r1, it is only known that the vehicle is located (or exists) in the RSU1 region.

However, referring to FIG. 9B, if deployment information of the neighboring RSU is transmitted together, the first OBU at the same position as in FIG. 9A receives neighboring RSU information, so that it may recognize that its own vehicle is located in a region other than the overlapping region within the RSU1 region.

That is, as in this embodiment, when receiving a V2I message further including the neighboring RSU information having overlapping coverage, the first OBU may know whether its own vehicle is located outside the overlapping region (RSU12, RSU13, RSU14, RSU15). According to an embodiment of the present disclosure, since the recognition region is narrowed, the resolution of position recognition may be increased.

FIG. 10 is a diagram for describing a method of acquiring position information of a vehicle based on information on a neighboring road side unit (RSU) as an embodiment to which the present disclosure is applied.

Referring to FIG. 10, the first OBU (or a vehicle equipped with the first OBU) receives an IPM message (or V2I message) including neighboring RSU (i.e. a second RSU, a third RSU, a fourth RSU, and a fifth RSU) information of the first RSU from the first RSU, and it is assumed that the first OBU fails to receive the IPM message (or V2I message) from the neighboring RSU (or receives a signal from the neighboring RSU but receives a signal less than a predetermined threshold).

In this case, the vehicle may recognize that its position belongs to the remaining regions except for the region that intersects with the neighboring RSU region among the first RSU region.

In one embodiment, the vehicle receiving the IPM message transmitted from the first RSU may check whether a signal is received from the neighboring RSU indicated by the neighboring RSU container of the IPM message for a specific time. That is, the vehicle may detect a signal transmitted from the neighboring RSU for a predetermined time. In this case, the predetermined time may be set larger than an IPM transmission period.

FIGS. 11A and 11B are diagrams for describing a method of acquiring position information of a vehicle based on information on a neighboring road side unit (RSU) as an embodiment to which the present disclosure is applied.

Referring to FIG. 11A, it is assumed that the first RSU and the second RSU are installed to have an overlapping region (r_RSU12), and the vehicle equipped with the second OBU receives a V2I message from the first RSU and the second RSU. In this case, the second OBU may recognize (or estimate) that the position of its own vehicle belongs to r_RSU12.

Referring to FIG. 11B, it is assumed that the first RSU, the second RSU, the third RSU, and the fourth RSU are installed to have an overlapping region (r_RSU12+r_RSU123+r_RSU124), and the vehicle equipped with the second OBU receives a V2I message from the first RSU and the second RSU.

When the coverage of the first RSU, the second RSU, the third RSU, and the fourth RSU overlap as shown in FIG. 11B, even in a region where two signals transmitted from the first RSU and the second RSU overlap, the resolution of position recognition may be increased. That is, the second OBU may recognize (or estimate) that the position of its own vehicle belongs to r_RSU12. In this case, according to the signals transmitted from the third RSU and the fourth RSU, it may be recognized whether it is located in a region overlapping with the corresponding RSU or a region excluding a region overlapping with the corresponding RSU. Through this, it is possible to more accurately estimate the position of the vehicle.

FIG. 12 is a diagram for describing a method of acquiring position information of a vehicle based on information on a neighboring road side unit (RSU) as an embodiment to which the present disclosure is applied.

Referring to FIG. 12, it is assumed that the second OBU (or a vehicle equipped with the second OBU) receives an IPM message (or V2I message) including neighboring RSU (i.e. a second RSU, a third RSU, and a fourth RSU) information of the first RSU from the first RSU, and the second OBU fails to receive the IPM message (or V2I message) from the second RSU among neighboring RSUs (or receives a signal from the neighboring RSU but receives a signal equal to or higher than a predetermined threshold from the second RSU).

In an embodiment of the present disclosure, the IPM message transmitted from the first RSU may include not only information on the first RSU, but also information on 2 RSUs, 3rd RSUs, and 4th RSUs installed nearby.

The second OBU may receive a message from the first RSU and the second RSU, but may not receive signals from other RSUs among neighboring RSUs or may receive signals less than or equal to a threshold. In this case, the vehicle may recognize that its position belongs to the remaining regions except for the region that intersects with the RSU region that has not received a signal among the intersection region (i.e. the region where the coverage of the first RSU and the second RSU overlap) of the first RSU and the second RSU.

In one embodiment, the vehicle receiving the IPM message transmitted from the first RSU may check whether a signal is received from the neighboring RSU indicated by the neighboring RSU container of the IPM message for a specific time. That is, the vehicle may detect a signal transmitted from the neighboring RSU for a predetermined time. In this case, the predetermined time may be set larger than an IPM transmission period.

FIG. 13 is a diagram illustrating an indoor positioning message (IPM) structure including information on a neighboring load side unit (RSU) according to an embodiment of the present disclosure.

Referring to FIG. 13, the IPM message may include an ITS protocol data unit (PDU) header and a plurality of containers. The ITS PDU header is a common header including information on a protocol version, message type, and ITS ID of the originating V2X communication device. The ITS PDU header is a common header used in the ITS message and exists at the beginning of the ITS message. The ITS PDU header may be referred to as a common header or a header.

The plurality of containers may include an originating RSU container (OriginalRsuConatiner) including position information of the RSU, a service container (RsuServiceContainer) defining services provided at the position and/or a neighboring RSU container (NeighborRsuContainer) including the neighboring RSU information.

FIGS. 14A and 14B are diagrams illustrating a data frame structure of an indoor positioning message (IPM) including information on a load side unit (RSU) according to an embodiment of the present disclosure.

Referring to FIGS. 14A and 14B, the configuration of an IPS message is expressed as ASN.1 and may be defined in a standard document, and may be transmitted/received based on this.

Referring to FIG. 14A, the IPS message is defined as a sequence and may include a header, an originating RSU container (OriginalRsuConatiner), a service container (RsuServiceContainer), and a neighboring RSU container (NeighborRsuContainer). In addition, the originating RSU container and the service container may have the same data frame structure as the originating RSU container and service container described in FIGS. 7A to 7C. As an example, the neighboring RSU container may be defined as a neighboring RSU list (DF_NeighborRsuList) including one or more neighboring RSU information.

In an embodiment of the present disclosure, the data frame structure of the neighboring RSU container may be defined as shown in FIG. 14B. The neighboring RSU list may be composed of a combination of neighboring RSU containers (DF_NeighborRsuContainers), and may be defined up to 10. The neighboring RSU container is a container that includes arrangement information of the neighboring RSU, and may include an RsuID parameter indicating RSU identification information, an RsuPos parameter indicating the position information of the RSU and/or a TransmissionPower parameter indicating transmission power of the RSU.

The above-described data or parameters may be expressed as integers, and the unit may be −xdBm. For example, when a value of the transmission power parameter is 75, it indicates that the RSU transmitted a message with a power of −75 dBm. The coverage parameter is a radius based on the RSU and may be expressed as an integer, and the unit may be 0.1 meter. For example, when a value of the coverage parameter is 300, it indicates that the signal of the RSU is transmitted up to a radius of 30 meters around the reference position (i.e. the position of the RSU). If the receiver receives a signal transmitted from the corresponding RSU, it may be estimated that its own vehicle exists within a 30-meter radius of the reference position.

FIG. 15 is a diagram for describing a method of acquiring position information of a vehicle based on reception power level information as an embodiment to which the present disclosure is applied.

In an embodiment of the present disclosure, a localization methods through transmission of layer data (or information) is proposed for more precise position measurement using the RSU. In the present disclosure, the layer data may represent table information of a received signal level within a predefined area, and the layer data may be referred to as layer information, a reception power table, a reception power matrix, a reception signal level table, a reception signal level matrix, and the like. That is, the layer data for a corresponding service area may be generated for positioning in an indoor fixed area such as an underground parking lot.

Referring to FIG. 15, the service area may be set as a two-dimensional area in the horizontal direction (i.e. the x-axis direction) and the vertical direction (i.e. the y-axis direction). The service area is basically configured of a rectangle, and a reference point (Pos_reference) is configured at a specific position. Further, the distribution of RSSI values within the service area may be determined as shown in FIG. 15 based on the position of the first RSU.

Specifically, an RF signal from which a signal transmitted from the first RSU is measured may be indicated at each position in the service area. In an embodiment, the level of the RSU signal may be expressed as a received signal strength indication (RSSI) value. In this case, the RSSI value is attenuated according to path-loss attenuation in the horizontal and vertical directions. The RSSI value at each position may be calculated (or acquired) based on the transmission power and path-loss model of the RSU, or may be acquired through actual measurement.

In this way, the layer data of the first RSU may be generated, and in the same way, the layer data of all RSUs in the service area may be generated.

In the present embodiment, by transmitting a V2I message including the layer data of the RSU in the service area, it is possible to accurately acquire the position of the vehicle within the service area.

FIG. 16 is a diagram for describing a method of acquiring position information of a vehicle based on reception power level information as an embodiment to which the present disclosure is applied.

Referring to FIG. 16, the service area described in FIG. 15 may be divided at regular intervals, as shown in FIG. 16. That is, in order to convert the RSSI value of the 2D plane structure into a value for transmission, layer data indicating a received signal table by the corresponding RSU may be generated (or configured) with a data structure as shown in FIG. 16.

The layer data may be configured based on 2D coordinates. In this case, the x-axis and y-axis may be indexed from 1 to n or m, respectively. The interval between indices may be expressed as delta x and delta y values. The signal characteristics of the first RSU may be determined at each point. For example, RSSI46 may have a mean value and/or a covariance value of position 4 on the x-axis and position 6 on the y-axis based on the lower left reference point.

FIG. 17 is a diagram for describing a method of acquiring position information of a vehicle based on layer information including a reception power level table as an embodiment to which the present disclosure is applied.

Referring to FIG. 17, the RSU may generate a V2I message by collecting layer data values of all RSUs existing in a predefined service area. In addition, the generated message may be delivered to the V2X vehicle driving the service area. The V2X vehicle receiving the V2I message may acquire the position of the V2X vehicle based on the layer data and the received RSU signal. That is, as shown in FIG. 17, the V2X vehicle may process a signal by overlapping layer information received from the RSU.

The layer data value received through the V2I message may be defined as in Equation 1 below. Here, i represents the index of the RSU, ix represents the index in the x-axis direction, and iy represents the index in the y-axis direction. The ix and iy may have maximum values of n and m, respectively.

$$\text{Layer}_{RSU^i} = \text{RSSI}_{ix,iy}^i, (ix \ni [0,n], iy \ni [0,m]) \quad \text{[Equation 1]}$$

The receiver may determine the position of the receiver by receiving the layer data value. A method of acquiring a position based on the layer information will be described in detail with reference to the drawings below.

FIG. 18 is a diagram for describing a method of acquiring position information of a vehicle based on layer information including a reception power level table as an embodiment to which the present disclosure is applied.

Referring to FIG. 18, a V2X receiver of a vehicle may measure actually received RF reception power. The RSSI value acquired by measuring a signal from each RSU is expressed as $\overline{\text{RSSI}}$. In addition, as shown in Equation 2 below, an operation of subtracting $\overline{\text{RSSI}}$, which is an RSSI of a corresponding RSU, from a layer of each received RSU may be performed. If there is no received RSU signal, a difference value operation may be performed using noise power.

$$\text{diff}^i = \text{Layer}_{RSU^i} - \overline{\text{RSSI}^i} \quad \text{[Equation 2]}$$

The final RSSI difference value may be acquired as shown in Equation 3 below by summing the difference value Diff calculated using Equation 2 above in all RSUs.

$$\text{Diff}_{RSSI} = \sum_{i=1}^{N} \text{diff}^i = \sum_{i}^{N} \left( \text{Layer}_{RSU^i} - \overline{\text{RSSI}^i} \right) \quad \text{[Equation 3]}$$

The index value of the position with the least difference value becomes the position of the receiver among the values acquired like this. The determination of the minimum value described above may be expressed as Equation 4 below.

$$[ix,iy] = \text{argmin}(|\text{Diff}_{RSSI}|) \quad \text{[Equation 4]}$$

In addition, a horizontal coordinate value x and a vertical coordinate value y indicating the actual vehicle position may be acquired by using Equation 5 below. Here, POSx and POSy are reference positions (or reference points), and Δx and Δy represent the interval between indices.

$$x = POS_x + ix \times \Delta x$$

$$y = POS_y + iy \times \Delta y \quad \text{[Equation 5]}$$

In the above, the method of acquiring the position of the vehicle using reception power (for example, RSSI) has been described. Meanwhile, when the position information the vehicle is acquired using the RSSI as in the above-described embodiment, an error may occur due to interference or path-loss by neighboring signals.

In another embodiment, a V2I message including time information may be used to solve such a problem and to measure the position more precisely. For example, when synchronizing all the time of RSUs in a service area through a location based server (LBS), instead of the RSSI layer information, it may be replaced with time of arrival (ToA) or added together with the RSSI layer information. Here, the ToA value is a time the signal was received. If ToA is used instead of the RSSI layer information, the ToA value may be replaced with the RSSI to be operated in the same manner in Equations 1 to 5 described above.

Hereinafter, a structure of an IPM message to which a method for improving position recognition performance through transmission of RSU ray information described above is applied will be described.

FIG. 19 is a diagram illustrating an indoor positioning message (IPM) structure including layer information of a load side unit (RSU) according to an embodiment of the present disclosure.

Referring to FIG. 19, the IPM message may include an ITS protocol data unit (PDU) header and a plurality of containers. The ITS PDU header is a common header including information on a protocol version, message type, and ITS ID of the originating V2X communication device. The ITS PDU header is a common header used in the ITS message and exists at the beginning of the ITS message. The ITS PDU header may be referred to as a common header or a header.

The plurality of containers may include an originating RSU container (OriginalRsuConatiner) including position information of the RSU, a service container (RsuService-Container) defining services provided at the position and/or a neighboring RSU container (NeighborRsuContainer) including layer information of RSU within a specific region. The neighboring RSU layer container may include a common layer (commonLayer) indicating the overall configuration of the layer, and RSU layer data (RsuLayerData) parameter (or DF) indicating each RSU layer information as many as the number of RSUs.

FIGS. 20A and 20B are diagrams illustrating a data frame structure of an indoor positioning message (IPM) including layer information of a load side unit (RSU) according to an embodiment of the present disclosure.

Referring to FIGS. 20A to 20B, the configuration of an IPS message is expressed as ASN.1 and may be defined in a standard document, and may be transmitted/received based on this.

Referring to FIG. 20A, the IPS message is defined as a sequence and may include a header, an originating RSU container (OriginalRsuConatiner), a service container (RsuServiceContainer) and a neighboring RSU layer container (NeighborRsuLayerContainer). In addition, the originating RSU container and the service container may have the same data frame structure as the originating RSU container and service container described in FIGS. 7A to 7C. As an example, the neighboring RSU container may be defined as a neighboring RSU list (DF_NeighborRsuList) including one or more neighboring RSU information.

In an embodiment of the present disclosure, the data frame structure of the neighboring RSU layer container may be defined as shown in FIG. 20B. As an example, the neighboring RSU layer container may be defined as DF_NeighborRsuLayerContainer. The corresponding data frame indicates information on a service area commonly used for a layer. The ReferencePosition parameter indicates the reference position that becomes the reference point. In addition, the y-axis of the layer plane may be displayed through an angleFromNorth parameter value indicating a difference from the actual north direction, and may be displayed as an angle different from the y-axis of the layer plane in a clockwise direction around the north direction. In this case, it may have a unit of 0.1 degrees. The distance between indices used for dividing the layer plane may be displayed through the DeltaX and DeltaY parameters. This value may be expressed as an integer and may be expressed in 0.1 meter unit.

In an embodiment, the RSU layer data may be included through NeighborRsuLayerList parameters up to 10. In addition, the layer data may be defined as an array of 2D integer values through RsuLayerData parameter.

FIGS. 21A and 21B are diagrams illustrating a method of acquiring position information through transmission power control as an embodiment to which the present disclosure is applied.

In an embodiment of the present disclosure, as shown in FIGS. 21A and 21B, the RSU may control the coverage by controlling transmission power of the V2I message at a specific time interval, and may further improve the position measurement performance of V2X vehicles through the coverage control.

In FIGS. 21A and 21B, it is assumed that a plurality of RSUs are operated together through an LBS host server 100. That is, the plurality of RSUs 210, 220, 230, and 240 may be connected through the LBS host server 100. In addition, the LBS host server 100 may control RSU transmission power in a specific time period.

Referring to FIG. 21A, a signal may be strongly transmitted from the first RSU and the third RSU, and relatively weakly transmitted from the second RSU and the fourth RSU at time T1. And, referring to FIG. 21B, the transmission power of the RSU connected to the LBS host server 100 may be changed at time T2 after the specific time interval has elapsed. In this case, as opposed to T1, signals are weakly transmitted from the first RSU and the third RSU, and signals may be strongly changed and transmitted from the second RSU and the fourth RSU.

That is, the coverage of the RSUs may be changed by controlling the transmission power of the installed RSUs in a certain time unit. FIGS. 21A and 21B, a first vehicle 310 may receive a signal from the first RSU at time t1 and from the second RSU at time t2, in this case, the first vehicle 310 may relatively accurately determine its own position.

In this way, it is possible to improve position recognition performance by controlling the transmission power in a predetermined time unit and transmitting the changed coverage information. In this case, a proposed transmission power control method may be applied to the stand-alone method described above, the proposed transmission power control method may be applied to neighboring RSU transmission method, and the proposed transmission power control method may be applied to an RSU layer information transmission method. In the following, each will be described in detail.

FIGS. 22A and 22B are diagrams illustrating a method of acquiring position information through transmission power control of a stand-alone-based RSU as an embodiment to which the present disclosure is applied.

FIGS. 22A and 22B, it may be possible to improve the position recognition performance through the transmission power control of the first RSU 210 of the stand-alone method. The LBS server 100 may control the transmission power of the first RSU 210 at a predetermined time period. In one embodiment, it may operate independently without the LBS server 100. The first RSU may transmit a V2I message based on the transmission power value according to the set period.

In FIGS. 22A and 22B, it is assumed that the transmission power is controlled in three steps, but the description is not limited thereto, the transmission power may be controlled in the RSU of the stand-alone method in various steps.

At time T1, the widest coverage may be set by transmitting the V2I message with the highest transmission power. For example, the maximum power may be set not to exceed the maximum transmission power of the 5.9 GHz band. In this case, the vehicle 310 traveling in the coverage region may receive a signal from the first RSU and recognize that the vehicle 310 exists within the coverage of the first RSU.

At time T2, a relatively small coverage may be set by transmitting the V2I message with a transmission power lower than that of T1. If the vehicle 310 also receives a signal transmitted at time T2, the vehicle 310 may recognize that the region in which it is located exists in $d_{RSU}{}^{t2}$ region. Likewise, at time T3, a relatively smaller coverage may be set by transmitting the V2I message with a transmission power lower than that of T2. In this case, if the vehicle 310 does not receive the corresponding signal, the vehicle 310 may recognize that the region in which it is located is included in $d_{RSU}{}^{t2}$ and exists in a region outside $d_{RSU}{}^{t3}$.

FIGS. 23A and 23B are diagrams illustrating a data frame structure of an indoor positioning message (IPM) including transmission power control information according to an embodiment of the present disclosure.

Referring to FIGS. 23A and 23B, the configuration of an IPS message is expressed as ASN.1 and may be defined in a standard document, and may be transmitted/received based on this.

As described above, the IPS message is defined as a sequence and may include a header, an originating RSU container (OriginalRsuConatiner), a service container (RsuServiceContainer), and a neighboring RSU container (NeighborRsuContainer). And, referring to FIG. 23 (a), the originating RSU container may further include a power control container (PoweowerControlContainer) (or a power control list (PowerControlList)) including transmission power control information in addition to the parameter (or DF) included in the outgoing RSU container described in FIGS. 7A to 7C above.

The data frame structure of the power control container may be defined as shown in FIG. 23B. As an example, the power control container may include a power control index (PCindex), a power control interval (PCInterval), a transmission power list (TransmissionPowerList), and/or a coverage list (CoverageList) parameter (or DF). The power control index represents the index of the mode transmitted in the current setting. The power control interval represents a time interval at which the transmission mode is changed. The transmission power list represents transmission power for each power control index. The coverage list represents a coverage list corresponding to transmission power and may be expressed in 0.1 meter unit.

FIGS. 24A and 24B are diagrams illustrating a method of acquiring position information through transmission power control of a V2I message including neighboring RSU information as an embodiment to which the present disclosure is applied.

Referring to FIGS. 24A and 24B, in the case of a method of transmitting the V2I message including the neighboring RSU information, similarly, by controlling the transmission power of the RSUs connected through the LBS server 100, it is possible to estimate subdivided regions in which the vehicle exists. That is, as shown in FIG. 24B, by controlling the transmission power together with the neighboring RSU information, it is possible to refine the region that the vehicle can perceive.

In FIGS. 24A and 24B, it is assumed that the transmission power is controlled in three steps, but the description is not limited thereto, the transmission power may be controlled in the RSU using a method of transmitting the V2I including the neighboring RSU information in various steps.

FIGS. 25A and 25B are diagrams illustrating a data frame structure of an indoor positioning message (IPM) including transmission power control information according to an embodiment of the present disclosure.

Referring to FIGS. 25A and 25B, even in the case of a method of transmitting V2I including neighboring RSU information, the configuration of an IPS message is expressed as ASN.1 and may be defined in a standard document, and may be transmitted/received based on this.

As described above, in the case of the method of transmitting the V2I including the neighboring RSU information, the IPS message is defined as a sequence and may include a header, an originating RSU container (OriginalRsuConatiner), a service container (RsuServiceContainer), and a neighboring RSU container (NeighborRsuContainer). And, referring to FIG. 25 (a), the neighboring RSU container may further include a power control container (PoweowerControlContainer) (or a power control list (PowerControlList)) including transmission power control information in addition to the parameter (or DF) included in the neighboring RSU container described in FIGS. 14A to 14(c) above.

The data frame structure of the power control container may be defined as shown in FIG. 25B. As an example, the power control container may include a power control index (PCindex), a power control interval (PCInterval), a transmission power list (TransmissionPowerList), and/or a coverage list (CoverageList) parameter (or DF). The power control index represents the index of the mode transmitted in the current setting. The power control interval represents a time interval at which the transmission mode is changed. The transmission power list represents transmission power for each power control index. The coverage list represents a coverage list corresponding to transmission power and may be expressed in 0.1 meter unit.

FIG. 26 is a diagram illustrating a method of acquiring position information through transmission power control of a V2I message including RSU layer information as an embodiment to which the present disclosure is applied.

Referring to FIG. 26, the method of transmitting layer data may also improve the performance of position recognition through the transmission power control. In an embodiment of the present disclosure, when using a plurality of RSU layer data determined based on transmission power that periodically changes according to a specific time interval, diversity gain may be increased, rather than receiving multiple times through one layer, and through this, performance of position estimation may be improved.

FIG. 27 is a diagram illustrating a data frame structure of an indoor positioning message (IPM) including transmission power control information according to an embodiment of the present disclosure.

Referring to FIG. 27, even in the case of a method of transmitting V2I including RSU layer information, the configuration of an IPS message is expressed as ASN.1 and may be defined in a standard document, and may be transmitted/received based on this.

As described above, in the case of the method of transmitting the V2I including the RSU layer information, the IPS message is defined as a sequence and may include a header, an originating RSU container (OriginalRsuContainer), a service container (RsuServiceContainer), and a neighboring RSU container (NeighborRsuContainer). And, referring to FIG. 27, the neighboring RSU container may further include a power control index (PCindex), a power control interval (PCInterval) parameter (or DF) in addition to the parameter (or DF) included in the neighboring RSU container described in FIGS. 20A to 20B above. The power control index represents the index of the mode transmitted in the current setting. The power control interval represents a time interval at which the transmission mode is changed.

Hereinafter, a location-based service that may be included in a V2I message (or IPM message) will be described in detail.

In the V2I system, the RSUServiceContainer of the message may include service information for user convenience and control information for safety. Here, the service information may include serviceType and serviceData parameters. The ServiceType parameter represents the type of service. In addition, the serviceData parameter represents detailed data according to a corresponding service. Table 1 below illustrates a table of services that can be provided according to an embodiment.

TABLE 1

| | ServiceType | ServiceData | Description |
|---|---|---|---|
| 1 | Remaining distance of tunnel | Integer | Unit 1 meter unit |
| 2 | Tunnel shelter position | Integer | Distance from RSU to corresponding position, Unit 0.1 meter unit |
| 3 | Parking fee information | Integer | Fee per minute |
| 4 | Parking fee information | Integer | Fee per hour |
| 5 | Parking allowed | Integer | Display number of vehicles |
| 6 | Parking available | Integer | Display number of vehicles |
| 7 | Parking floors | Interger | −127~128 floors |
| 8 | Position of parking emergency exit | Binary | Binary data transmission of JPG file |

Referring to Table 1, when ServiceType value is 1, it indicates a remaining distance of the tunnel. At this time, serviceData may represent the remaining distance in 1 meter unit. For example, if the tunnel remains 1 kilometer, serviceData may be expressed as 1000. When ServiceType value is 2, it indicates the position of the tunnel shelter. ServiceData may represent the distance from the RSU position to the corresponding position. In the same way, when ServiceType value is 3 or 4, a service guiding the parking fee may be provided, and it indicates the parking fee per minute/hour, respectively. When ServiceType value is 5 or 6, it indicates the total number of vehicles to be parked in the parking lot and the number of vehicles available in the parking lot. When ServiceType value is 7, it indicates the number of floors in the parking lot. At this time, from −127 floor to 128th floor may be expressed through serviceData. When ServiceType value is 8, a service indicating the position of an emergency exit of the parking lot is provided. At this time, a JPG file may be transmitted through ServiceData.

Control information may provide location-based services through ControlType and ControlData parameters. Here, ControlType is a parameter indicating the type of service, and detailed data according to a corresponding service may be provided through the ControlData parameter. Table 2 below illustrates a control table that can be provided according to an embodiment.

TABLE 2

| | ControlType | ControlData | Description |
|---|---|---|---|
| 1 | Tunnel entry mode | 0 or 1 | Tunnel entry control, (0: No entry, 1: Allow entry) |
| 2 | Tunnel light mode | 0 or 1 | Setting to turn on and off headlight when entering tunnel (0: off, 1: on) |
| 3 | Tunnel speed limit | integer | Speed limit notation, unit x-K meter/h |
| 4 | Height of vehicle entering the tunnel | Integer | Unit 0.1 meter unit |
| 5 | Allow entry to parking lot | 0 or 1 | Parking lot entry control, (0: No entry, 1: Allow entry) |
| 6 | Height of vehicle entering parking lot | Integer | Unit 0.1 meter unit |
| 7 | No parking area | 0 or 1 | 0. No parking 1. Disabled area, 2, Reserved, 3. Residential parking permit |

Referring to Table 2, when ControlType value is 1, it indicates a tunnel entry mode. At this time, when ControlData is 0, no entry may be indicated, and when ControlData is 1, allow entry may be indicated. When ControlType value is 2, it indicates an operation of a headlight in the tunnel. When ControlData is 0, it may indicate to turn off the headlight, and when ControlData is 1, it may indicate to turn on the headlight. When ControlType value is 3, a driving speed in the tunnel may be limited. In this case, the speed limit may be expressed in km/h through ControlData.

When ControlType value is 4, the height of the vehicle that can enter may be limited. In this case, the vehicle height may be expressed in 0.1 meter unit through ControlData. When ControlType value is 5, it notifies whether or not it is possible to enter an indoor parking lot. In this case, when ControlData is 0, no entry is indicated, and when ControlData is 1, allow entry is indicated. When ControlType value is 6, the height of the vehicle that can enter the parking lot is limited. The vehicle height may be expressed in 0.1 meter unit through controlData. When ControlType value is 7, a service for guiding no parking areas may be provided. When the data is received, if the corresponding area is an area where parking is not possible, it may be marked as 0. At this time, when controlData is 1, a disabled area may be indicated, when controlData is 2, a reserved area may be indicated, and when controlData is 3, a residential parking permit area may be indicated.

FIG. 28 is a diagram illustrating a V2I system structure according to an embodiment of the present disclosure.

Referring to FIG. 28, the V2I system may include one or more RSUs 100 for improving position recognition performance and location-based services proposed by the present disclosure. Service control and system control are performed for the RSUs through a location-based service (LBS) server 300. The RSU 100 may include an input/output port for receiving a signal from an external system. In other words, the RSU 100 may include an input/output port 111 for communicating with the LBS server 300. Through this, control information or service information may be received from the LBS server 300, or its own state information, response information, or monitoring information may be transmitted to the LBS server 300.

In addition, the RSU 100 may acquire position information of the current RSU 100 through the GNSS/LocalPositioninginfo. 112 block. In addition, the RSU 100 may be connected to an external sensor 113 to acquire a neighboring state and a vehicle state.

The RSU 100 may generate a parameter for controlling a V2X modem 140 through an LBSservice block 131, an Original&Neigbor RSU infor. generation block 132, and a DSRCPowerControl block 133 using information received through a V2I system controller 120.

The LBS service block 131 generates service information and control information to be used in the RSUServiceContainer in order to provide the service received from the LBS server to the OBU. As described above, in the case of parking lot guidance and tunnel guidance, serviceType and serviceData are generated according to the service table. In addition, when the vehicle is controlled in a corresponding area such as setting the tunnel entry mode and the parking lot height, ControlType and ControlData suitable for the corresponding control are generated.

The Original&NeigborRSUinfor generation block 132 collects neighboring RSU information received from the LBS server 300 to improve position recognition performance, and generates a V2I message including the RSU information installed around itself and the neighboring RSU.

As an example, when the Original&NeigborRSUinfor generation block 132 operates in a stand-alone method, it may generate an OriginalRSUcontainer including an RSU position indicating its own RSU information, a transmission power, and a transmission coverage. When the power control mode is turned on, a PowerControlList may be generated by summing the power value and change period information that change in its RSU.

As another example, when the Original&NeigborRSUinfor generation block 132 operates in a neighboring RSU information transmission method, it may receive neighboring RSU information through the V2I system controller 120, and generate DF_NeighborRsuList using this. When the power control mode is turned on, a PowerControlList is generated based on the power value and change period information that change in its RSU, and the generated PowerControlList may be added to a neighborRSUcontainer that includes information on the neighboring RSUs.

As another example, when the Original&NeigborRSUinfor generation block 132 operates in the RSU layer information transmission method, it may receive layer information of neighboring RSUs through the V2I system controller 120, and generate a DF_NeighborRsuLayer field using this. When the power control mode is turned on, the V2I message may be generated based on all NeighborRSULayers that change over time.

The DSRCPowerControl block 133 may control transmission power to be applied to the V2X modem 140. When the power control is not applied, the transmission power of the V2X modem 140 may be controlled by receiving the set transmission power from the LBS server 300. When the power control is applied, the transmission power of the V2X modem 140 may be controlled according to a predetermined time period with the transmission power controlled by the LBS server 300. Finally, the V2X modem 140 may generate and transmit the V2I message based on the corresponding parameter.

The V2I message generated in this way may receive a corresponding message from a vehicle (OBU) 200 traveling around the RSU 100 to acquire more precise position information as well as a service suitable for the position, and may be controlled based on this. To this end, the V2X modem 240 exists in the receiver in the same way as the transmitter. A reception power measurement block 233 may extract (or acquire) an RSSI for measuring reception power in an access layer.

An LBS service code extraction block 232 and an Original & NeighborRSUinfo extraction block 233 extract each related information from a facility layer. In addition, information extracted through the V2I system controller 220 may be combined. Then, based on this, the position of the vehicle is estimated, and the provided service is extracted. The service and control based on the extracted position may be notified to a driver through a human interface 211 that transmits video or audio, and further, the vehicle may be controlled through a Service Controller 212.

FIG. 29 is a flowchart illustrating a method of transmitting a V2I message by an RSU in a stand-alone method according to an embodiment of the present disclosure.

Referring to FIG. 29, an RSU, which is a transmitter, transmits a V2I message to a neighboring V2X vehicle. To this end, the following operation may be performed. However, the present disclosure is not limited, and some of the following steps may be omitted, or other steps may be additionally performed in addition to steps presented below. In addition, in each step, embodiments described with reference to FIGS. 3 to 28 may be applied.

1) The RSU initializes a system. 2) The RSU acquires location service information and/or power control information through the LBS server. 3) The RSU generates the V2I message using the acquired information through the V2I system. 4) If an LBS service exists, the RSU generates an RSU service container field of the V2I message. 5) The RSU generates a transmission packet through a Networks & Transport layer using the generated message. 6) The RSU generates an access layer packet through a DSRC module. 7) When a power control is activated, the power control is performed according to a schedule received from the LBS server in the transmission power control block. 8) If the system does not end, the RSU waits for a certain time according to a preset transmission period, and then generates and transmits the V2I message again.

FIG. 30 is a flowchart illustrating a method of estimating position information of a vehicle based on a V2I message received from an RSU in a stand-alone method according to an embodiment of the present disclosure.

Referring to FIG. 30, an OBU of a vehicle, which is a receiver, receives a V2I message from the RSU. To this end, the following operation may be performed. However, the present disclosure is not limited, and some of the following steps may be omitted, or other steps may be additionally performed in addition to steps presented below. In addition, in each step, embodiments described with reference to FIGS. 3 to 28 may be applied.

1) The OBU of the vehicle initializes a system. 2) The OBU waits for reception of the V2I message from the RSU. 3) When a message is received from a V2I modem, the OBU decodes the V2I message according to a V2I message structure. 4) The OBU extracts (or acquires, induces) position information of the vehicle based on the V2I message and RSSI. 5) If an LBS service exists, the OBU acquires LBS service information and control information from the V2I message. 6) Then, the acquired LBS service information and control information are transferred to an application layer. 7) When a power control is activated, position recognition performance may be improved by accumulating the position information during the received power control interval. 8) The acquired position information and location-based service are transferred to an application. Through this, the position information and the location-based services may be provided to a driver. 9) If the system does not end, the V2I message is waiting to be received again.

FIG. 31 is a diagram illustrating a power control accumulation table according to transmission power control according to an embodiment of the present disclosure.

In an embodiment of the present disclosure, when the power control is used, a power control accumulation table as shown in FIG. 31 may be used. Such a table may be used in an accumulator block. Specifically, the power control accumulation table may include PCindex, TransmissionPowr, and coverage fields. Each field may be set based on received PowerControlList information.

In addition, the power control accumulation table may include detection state and detection accumulator fields. The detection state and detection accumulator fields may accumulate whether a signal corresponding to a corresponding PCindex is received. Here, when the detection state field is 'detected', it may indicate that the signal has been received, and when the detection state field is 'not detected', it may indicate that the signal is not received. In addition, the detection accumulator field indicates the number of continued previous state. If it is 10, it indicates that the signal has been continuously received for 10 periods. When the signal is received as shown in the table shown in FIG. 31, the vehicle may know that its own vehicle exists between 400 meters and 100 meters based on the RSU.

FIG. 32 is a flowchart illustrating a method of transmitting a V2I message including neighboring RSU information according to an embodiment of the present disclosure.

Referring to FIG. 32, an RSU, which is a transmitter, transmits a V2I message to a neighboring V2X vehicle. To this end, the following operation may be performed. However, the present disclosure is not limited, and some of the following steps may be omitted, or other steps may be additionally performed in addition to steps presented below. In addition, in each step, embodiments described with reference to FIGS. 3 to 28 may be applied.

1) The RSU initializes a system. 2) The RSU acquires location service information and/or power control information through an LBS server. 3) The RSU generates the V2I message using the acquired information through a V2I system. 4) The RSU generates a neighboring RSU container by collecting neighboring RSU information of the V2I message in the LBS server. 5) If an LBS service exists, the RSU generates an RSU service container field of the V2I message. 6) The RSU generates a transmission packet through a Networks & Transport layer using the generated message. 7) The RSU generates an access layer packet through a DSRC module. 8) When a power control is activated, the power control is performed according to a schedule received from the LBS server in a transmission power control block. 9) If the system does not end, the RSU waits for a certain time according to a preset transmission period, and then generates and transmits the V2I message again.

FIG. 33 is a flowchart illustrating a method of estimating position information of a vehicle based on a V2I message including neighboring RSU information according to an embodiment of the present disclosure.

Referring to FIG. 33, an OBU of a vehicle, which is a receiver, receives a V2I message from an RSU. To this end, the following operation may be performed. However, the present disclosure is not limited, and some of the following steps may be omitted, or other steps may be additionally performed in addition to steps presented below. In addition, in each step, embodiments described with reference to FIGS. 3 to 28 may be applied.

1) The OBU of the vehicle initializes a system. 2) The OBU waits for reception of the V2I message from the RSU. 3) When a message is received from a V2I modem, the OBU decodes the V2I message according to the V2I message structure to acquire originating RSU information and neighboring RSU information. 4) The OBU waits for (or senses) neighboring RSU signals for a certain time interval. 5) The OBU extracts (or acquires, induces) position information of the vehicle based on the V2I message and RSSI. 6) If an LBS service exists, the OBU acquires LBS service information and control information from the V2I message. 7) Then, the acquired LBS service information and control information are transferred to an application layer. 8) When a power control is activated, position recognition performance may be improved by accumulating the position information during the received power control interval. 9) The acquired position information and location-based service are transferred to an application. Through this, the position information and the location-based services may be provided to a driver. 10) If the system does not end, the V2I message is waiting to be received again.

FIG. 34 is a diagram illustrating a power control accumulation table according to transmission power control according to an embodiment of the present disclosure.

In an embodiment of the present disclosure, when the power control is used, the power control accumulation table as shown in FIG. 31 may be used. Such a table may be used in an accumulator block. Specifically, the power control accumulation table may include PCindex, TransmissionPowr, and coverage fields. Each field may be set based on received PowerControlList information.

In addition, the power control accumulation table may include detection state and detection accumulator fields. The detection state and detection accumulator fields may accumulate whether a signal corresponding to a corresponding PCindex is received. Here, when the detection state field is 'detected', it may indicate that the signal has been received, and when the detection state field is 'not detected', it may indicate that the signal is not received. In one embodiment of the present disclosure, since the position information is acquired from a plurality of RSUs, a plurality of power control accumulation tables may be used. In this case, each state may be accumulated and used for position calculation.

FIG. 35 is a flowchart illustrating a method of transmitting a V2I message including RSU information according to an embodiment of the present disclosure.

Referring to FIG. 35, an RSU, which is a transmitter, transmits a V2I message to a neighboring V2X vehicle. To this end, the following operation may be performed. However, the present disclosure is not limited, and some of the following steps may be omitted, or other steps may be additionally performed in addition to steps presented below. In addition, in each step, embodiments described with reference to FIGS. 3 to 28 may be applied.

1) The RSU initializes a system. 2) The RSU acquires location service information and/or power control information through an LBS server. 3) The RSU generates the V2I message using the acquired information through a V2I system. 4) The RSU generates a neighboring RSU layer container by collecting neighboring RSU information of the V2I message in the LBS server. 5) If an LBS service exists, the RSU generates an RSU service container field of the V2I message. 6) The RSU generates a transmission packet through a Networks & Transport layer using the generated message. 7) The RSU generates an access layer packet through a DSRC module. 8) When a power control is activated, the power control is performed according to a schedule received from the LBS server in a transmission power control block. 9) If the system does not end, the RSU waits for a certain time according to a preset transmission period, and then generates and transmits the V2I message again.

FIG. 36 is a flowchart illustrating a method of estimating position information of a vehicle based on a V2I message including neighboring RSU information according to an embodiment of the present disclosure.

Referring to FIG. 36, an OBU of a vehicle, which is a receiver, receives a V2I message from an RSU. To this end, the following operation may be performed. However, the present disclosure is not limited, and some of the following steps may be omitted, or other steps may be additionally performed in addition to steps presented below. In addition, in each step, embodiments described with reference to FIGS. 3 to 28 may be applied.

1) The OBU of the vehicle initializes a system. 2) The OBU waits for reception of the V2I message from the RSU. 3) When a message is received from a V2I modem, the OBU decodes the V2I message according to the V2I message structure to acquire originating RSU information and RSU layer information. 4) The OBU waits for (or senses) neighboring RSU signals for a certain time interval. 5) The OBU extracts (or acquires, induces) position information of the vehicle based on the V2I message and RSSI. 6) If an LBS service exists, the OBU acquires LBS service information and control information from the V2I message. 7) Then, the acquired LBS service information and control information are transferred to an application layer. 8) When a power control is activated, position recognition performance may be improved by accumulating the position information during the received power control interval. 9) The acquired position information and location-based service are transferred to an application. Through this, the position information and the location-based services may be provided to a driver. 10) If the system does not end, the V2I message is waiting to be received again.

In the case of using a power control mode, the position recognition performance may be improved by accumulating $\text{Diff}_{RSSI}$ for a predetermined period using an accumulator. The accumulation method may be implemented through Equation 6 below. That is, $\text{DIFF}_{RSSI}^{accumulator}$ may be calculated by continuously accumulating the received $\text{Diff}_{RSSI}$ at a predetermined rate. The accumulated ratio may be preset based on an alpha value.

$$\text{DIFF}_{RSSI}^{accumulator} = \alpha \times \text{DIFF}_{RSSI}^{accumulator} + (1-\alpha) \times \text{Diff}_{RSSI} \quad \text{[Equation 6]}$$

The index value of the position with the least difference value becomes the position of the receiver among the values acquired like this. The determination of the minimum value described above may be expressed as Equation 7 below.

$$[ix,iy] = \text{argmin}(|\text{DIFF}_{RSSI}^{accumulator}|) \quad \text{[Equation 7]}$$

In addition, a horizontal coordinate value x and a vertical coordinate value y indicating an actual vehicle position may be acquired by using Equation 5 below. Here, POSx and POSy are reference positions (or reference points), and $\Delta x$ and $\Delta y$ represent the interval between indices.

$$x = \text{POS}_x + ix \times \Delta x$$

$$y = \text{POS}_y + iy \times \Delta y \quad \text{[Equation 8]}$$

FIG. 37 illustrates a configuration of a V2X communication device according to an embodiment of the present disclosure. As described above, the V2X communication device may be referred to as a V2X communication device, a V2X device, or the like.

In FIG. 37, the V2X communication device 37000 may include a communication unit 37010, a processor 37020, and a memory 37030.

The communication unit 37010 may be connected to the processor 37020 to transmit/receive radio signals. The communication unit 37010 may up-convert the data received from the processor 37020 into a transmission/reception band to transmit a signal or down-convert the received signal. The communication unit 37010 may implement at least one operation of a physical layer and an access layer.

The communication unit 37010 may include a plurality of sub RF units to communicate according to a plurality of communication protocols. For example, communication unit 37010 may perform data communication, based on dedicated short range communication (DSRC), an IEEE 802.11 and/or 802.11p standards, an ITS-G5 wireless communication technology based on a physical transmission technology of the IEEE 802.11 and/or 802.11p standards, a 2G/3G/4G (LTE)/5G wireless cellular communication technology including satellite/broadband wireless mobile communication, a broadband terrestrial digital broadcasting technology such as DVB-T/T2/ATSC, a GPS technology, and an IEEE 1609 WAVE technology. The communication unit 37010 may include a plurality of transceivers implementing each communication technology.

The processor 37020 may be connected to the RF unit 37010 to implement the operation of the layers of the V2X communication device. The processor 37020 may be configured to perform operations according to various embodiments of the present disclosure according to the above-described drawings and description. In addition, at least one of a module, data, program, or software that implements the operation of the V2X communication device 37000 according to various embodiments of the present disclosure may be stored in the memory 3730 and executed by the processor 3720.

The memory 37030 is connected to the processor 37020, and stores various information for driving the processor 37020. The memory 37030 may be included inside the processor 37020 or installed outside the processor 37020 and connected to the processor 37020 by known means.

The processor 37020 of the V2X communication device 37000 may generate and transmit the IPM described in the present disclosure. A method of generating and transmitting an IPM by the V2X communication device 37000 will be described below.

FIG. 38 is a flowchart illustrating a method of acquiring position information from a V2I message by a V2X communication device according to an embodiment of the present disclosure.

Referring to FIG. 38, the V2X communication device receives a first V2I message including position information, transmission power information, and coverage information of a first RSU from a first road side unit (RSU) (S38010).

The V2X communication device acquires reception power of the first V2I message (S38020).

The V2X communication device acquires region information of the vehicle based on the reception power and the coverage of the first RSU (S38030). In this case, the region information may indicate whether the vehicle is located within the coverage of the first RSU or a specific region within the coverage of the first RSU.

In an embodiment, as described above with reference to FIGS. 8 to 14A and 14B and FIGS. 32 to 34, the V2I message may further includes neighboring RSU information. In this case, the region information may be acquired based on the reception power, the coverage of the first RSU, and coverage of the neighboring RSU.

In addition, as described above, the neighboring RSU information may includes position information, transmission power information, and coverage information of a second RSU having a coverage region overlapping the coverage of the first RSU.

In addition, as described above, it may be determined based on whether the region information includes a coverage region in which a specific region overlaps according to whether or not a second V2I message transmitted from the second RSU is received.

In one embodiment, as described above with reference to FIGS. 15 to 20A and 20B, 35 and 36, the neighboring RSU information may include position information and layer data of the neighboring RSU. Here, the layer data may indicate received signal strength indication (RSSI) table information within a predefined region.

In addition, in one embodiment, as previously described in FIGS. 21A and 21B to 36, the V2I message may further include at least one of a transmission power list, a control interval of transmission power, or coverage information corresponding to transmission power of the first RSU.

In addition, as described above, the step S38030 may further include checking whether to receive a third V2I message transmitted from the first RSU during a control interval. In this case, it may be determined whether the region information includes the coverage region corresponding to the transmission power in which the specific region is changed depending on whether or not to receive the third V2I message during the control interval.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative, but should be construed as being illustrative from all aspects. The scope of the disclosure should be determined by reasonable analysis of the attached claims, and all changes within the equivalent range of the disclosure are included in the scope of the disclosure.

Mode for Invention

Those skilled in the art will understand that the disclosure may be changed and modified in various ways without departing from the spirit or range of the disclosure. Accordingly, the disclosure is intended to include all the changes and modifications provided by the appended claims and equivalents thereof.

In this disclosure, both the apparatus and the method have been described, and the descriptions of both the apparatus and method may be complementarily applied.

Various embodiments have been described in the best form for implementing the disclosure.

INDUSTRIAL APPLICABILITY

The disclosure is used in a series of V2X communication fields.

Those skilled in the art will understand that the disclosure may be changed and modified in various ways without departing from the spirit or range of the disclosure. Accordingly, the disclosure is intended to include all the changes and modifications provided by the appended claims and equivalents thereof.

The invention claimed is:

1. A method of acquiring position information of a vehicle through Vehicle to Infrastructure (V2I) communication, the method comprising:
    receiving a first V2I message from a first road side unit (RSU); and
    acquiring region information for the vehicles;
    wherein the first V2I message includes an indoor positioning message (IPM) including an originating RSU container and a service container;
    wherein the first V2I message includes first RSU information and neighboring RSU information;
    wherein the first RSU information includes position information, transmission power information, and coverage information of the first RSU, wherein the neighboring RSU information includes position information, transmission power information and coverage information of a second RSU having a coverage region overlapping the coverage of the first RSU, wherein the region information is acquired based on the reception power, the coverage of the first RSU, and coverage of the neighboring RSU.

2. The method of claim 1, wherein the region information indicates (1) whether the vehicle is located within the coverage of the first RSU RSU or (2) a specific region within the coverage of the first RSU.

3. The method of claim 2, wherein the region information is determined based on whether the specific region includes the overlapping coverage region based on receiving a second V2I message transmitted from the second RSU.

4. The method of claim 1,
wherein the neighboring RSU information includes position information and layer data of the neighboring RSU, and
wherein the layer data represents received signal strength indication (RSSI) table information in a predefined region.

5. The method of claim 1, wherein the V2I message further includes at least one of a list of transmission power of the first RSU, a control interval of the transmission power, or coverage information corresponding to the transmission power.

6. The method of claim 5,
wherein acquiring region information for the vehicle further includes checking whether a third V2I message transmitted from the first RSU is received during the control interval, and
wherein the region information is determined based on whether the specific region includes a coverage region corresponding to a changed transmission power depending on whether the third V2I message is received during the control interval.

7. A vehicle to everything (V2X) communication device of a vehicle, comprising:
a memory configured to store data;
a transmitter and receiver configured to transmit and receive a radio signal including a vehicle to infrastructure (V2I) message; and
a processor configured to control the memory and the transmitter and receiver,
wherein the processor is further configured to:
receive a first V2I message from a first road side unit (RSU); and
acquire region information for the vehicle;
wherein the first V2I message includes an indoor positioning message (IPM) including an originating RSU container and a service container;
wherein the first V2I message includes first RSU information and neighboring RSU information;
wherein the first RSU information includes position information, transmission power information, and coverage information of the first RSU,
wherein the neighboring RSU information includes position information, transmission power information and coverage information of a second RSU having a coverage region overlapping the coverage of the first RSU,
wherein the region information is acquired based on the reception power, the coverage of the first RSU, and coverage of the neighboring RSU.

8. The apparatus of claim 7, wherein the region information indicates (1) whether the vehicle is located within the coverage of the first RSU or (2) a specific region within the coverage of the first RSU.

9. The apparatus of claim 7, wherein the region information is determined based on whether the specific region includes the overlapping coverage region based on receiving a second V2I message transmitted from the second RSU.

10. The apparatus of claim 7,
wherein the neighboring RSU information includes position information and layer data of the neighboring RSU, and
wherein the layer data represents received signal strength indication (RSSI) table information in a predefined region.

11. The apparatus of claim 7, wherein the V2I message further includes at least one of a list of transmission power of the first RSU, a control interval of the transmission power, or coverage information corresponding to the transmission power.

12. The apparatus of claim 11,
wherein the processor checks whether a third V2I message transmitted from the first RSU is been received during the control interval, and
wherein the region information is determined based on whether the specific region includes a coverage region corresponding to a changed transmission power depending on whether the third V2I message is received during the control interval.

* * * * *